United States Patent [19]

Molof et al.

[11] Patent Number: 5,128,040
[45] Date of Patent: Jul. 7, 1992

[54] WASTEWATER TREATMENT PROCESS

[75] Inventors: Alan H. Molof, New York, N.Y.; Zuwhan Yun, Seoul, Rep. of Korea

[73] Assignee: Polytechnic University, Brooklyn, N.Y.

[21] Appl. No.: 388,955

[22] Filed: Aug. 2, 1989

[51] Int. Cl.$^5$ .............................................. C02F 3/30
[52] U.S. Cl. ................................. 210/605; 210/627; 210/625; 210/630
[58] Field of Search ............... 210/605, 615, 617, 619, 210/625, 630, 622, 903

[56] References Cited

U.S. PATENT DOCUMENTS

| | | | |
|---|---|---|---|
| 2,391,494 | 12/1945 | Walker | 210/617 |
| 2,517,792 | 8/1950 | Kraus | 210/630 |
| 3,220,706 | 11/1965 | Voldespino | 210/624 |
| 3,654,147 | 4/1972 | Levin et al. | 210/630 |
| 4,056,465 | 1/1977 | Spector | 210/605 |
| 4,488,967 | 12/1984 | Block et al. | 210/605 |
| 4,522,722 | 6/1985 | Nichols | 210/605 |
| 4,663,044 | 5/1987 | Goronszy | 210/610 |
| 4,725,357 | 2/1988 | Downing et al. | 210/611 |
| 4,874,519 | 10/1989 | Williamson | 210/630 |
| 4,915,840 | 4/1990 | Rozich | 210/605 |
| 4,999,111 | 3/1991 | Williamson | 210/605 |
| 5,022,493 | 6/1991 | Williamson | 210/605 |

FOREIGN PATENT DOCUMENTS 137919 10/1979 German Democratic Rep. .
53-89259 8/1978 Japan .

OTHER PUBLICATIONS

Article—"Sewage Purification in South Africa—Past and Present", by D. W. Osborn, ISSN 0378-4738=Water SA vol. No. 3. Jul. 1988.
Article—"The Extracellular Polysaccharides of Bacteria", by J. F. Wilkinson, Bacteriology Department, University of Edinburgh, Edinburgh, Scotland.
Eckenfelder, W. Wesley, Jr., *Biological Phosphorus Removal: State of the Art Review*, Pollution Engineering, 88-93 (Sep., 1987).
Barnard, James L., *Activated Primary Tanks for Phosphate Removal*, Water SA, 10, No. 3, 121-126 (Jul. 1984).
Norris, D. P., Parker, D. S., Daniels, M. L., and Owens, E. L. 1980 *Efficiencies of Advanced Waste Treatment Obtained with Upgraded Trickling Filters*. Civil Engineering-ASCE, 48:96-101.
Norris, D. P., Parker, D. S., Daniels, M. L., and Owens, E. L. 1982. *High Quality Trickling Filter Effluent Without Tertiary Treatment*. J. Wat. Poll. Cont. Fed, 54:1087-98.
Fedotoff, R. C. 1983. *The Trickling Filter Finds New Partner*. Water Engineering & Management, Jun.:28-30 & 852.

(List continued on next page.)

*Primary Examiner*—Stanley S. Silverman
*Assistant Examiner*—Christopher Upton
*Attorney, Agent, or Firm*—Curtis, Morris & Safford

[57] ABSTRACT

A wastewater treatment process having improved solids separation characteristics and reduced biochemical oxygen demand (BOD) in the purified wastewater comprising the steps of: passing wastewater containing suspended solids and biodegradable organic substances through an aerobic biological oxidation zone and therein oxidizing a portion of the BOD and converting a portion of the BOD into additional suspended solids; passing the effluent from said aerobic biological oxidation zone to an aerobic/mixing zone and therein mixing said effluent with effluent from the anoxic/anaerobic zone; passing the effluent from said aerobic/mixing zone to a settling zone and therein separating purified wastewater having reduced BOD and suspended solids, and sludge containing suspended solids; passing a portion of the sludge formed in the settling zone to an anoxic/anaerobic zone and therein increasing the extracellular polymer content of said sludge; and recycling an effective amount of the effluent from said anoxic/anaerobic zone to said aerobic/mixing zone.

24 Claims, 12 Drawing Sheets

OTHER PUBLICATIONS

Niku, S., et al. 1982. *Reliability and Stability of Trickling Filter Process.* J. Wat. Poll. Cont. Fed., 54:129–34.

Foster, C. P. 1971. *Separation of Activated Sludge Using Natural and Synthetic Polymers.* Water Pollution Control, 71:363–66.

Tenny, M. W., and Stumm, W. 1965. *Chemical Flocculation of Microorganisms in Biological Waste Treatment.* J. Wat. Poll. Cont. Fed., 37:1370–88.

Gulas, V., Bond, M., and Benefield, L. 1979, *Use of Exocellular Polymers for Thickening and Dewatering Activated Sludge.* J. Wat. Poll. Cont. Fed., 51:798–807.

Pavoni, J., Tenny, M., and Echelberger, Jr., W. 1972. *Bacterial Exocellular Polymers and Biological Flocculation.* J. Wat. Poll. Cont. Fed., 44:414–31.

Friedman, B., et al. 1970. *Structure of Exocellular Polymers and Their Relationship to Bacterial Flocculation.* Journal of Bacteriology, 98:1328–1334 (1969).

Kiff, R. J. 1978. *A Study of the Factors Affecting Bioflocculation in the Activated Sludge Process.* Water Pollution Control, 77:464–70.

Harris, R. H., and Mitchell, R. 1975. *Inhibition of the Bioflocculation of Bacteria by Bioflocculation of Bacteria by Biopolymers.* Water Research, 9:993–99.

Symons, J. McKinney, R., and Hassis, H. 1960. *A Procedure for Determination of the Biological Treatability of Industrial Wastes.* J. Wat. Poll. Cont. Fed., 32:841–52.

Weng, C., and Molor, A. H. 1974. *Nitrification in the Biological Fixed-Film Rotating Disk System.* J. Wat. Poll. Cont. Fed., 46:1674–85 (1974).

Geher, R., and Henry, J. G. 1983; *Removal of Extracelluar Materials: Techniques and Pitfalls.* Water Research, 17:1743–48.

Novak, J. E., and Haugan, B. E. 1981. *Polymer Extraction from Activated Sludge.* J. Wat. Poll. Contr. Fed., 53:1420–24.

Brown, M. J., and Lester, J. N. 1980. *Comparison of Extracellular Polymer Extraction Methods.* Appli. & Environ. Microbiol., 40:179–85.

*Air Products and Chemical, Inc.* Brochure entitled *Environmental Products Update*, 2 pages (Jan. 1988).

Single page from *Air Products and Chemicals, Inc.* brochurec commencing "Reviewing the features of the UCT process . . . " (date unknown).

Dagger et al. . . . Journal WPCF 60, No. 10, P. 1834, (date unknown).

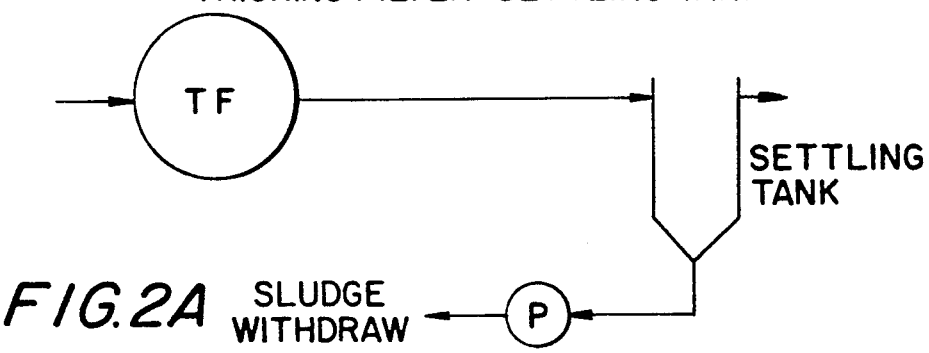
FIG.2A UNIT 1 TRICKING FILTER+SETTLING TANK
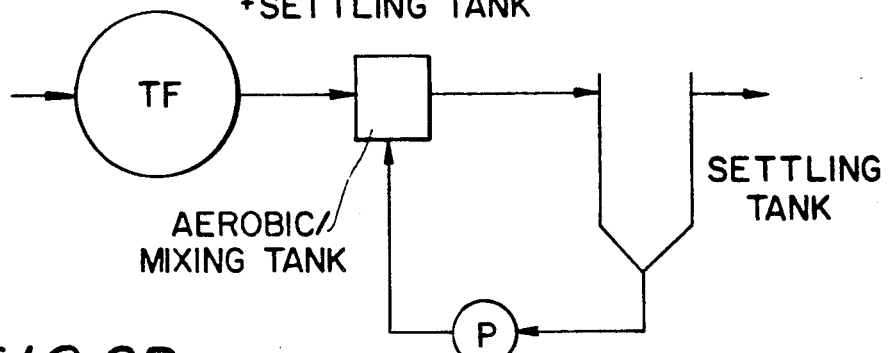
FIG.2B UNIT 2 TRICKING FILTER+AEROBIC/MIXING TANK +SETTLING TANK
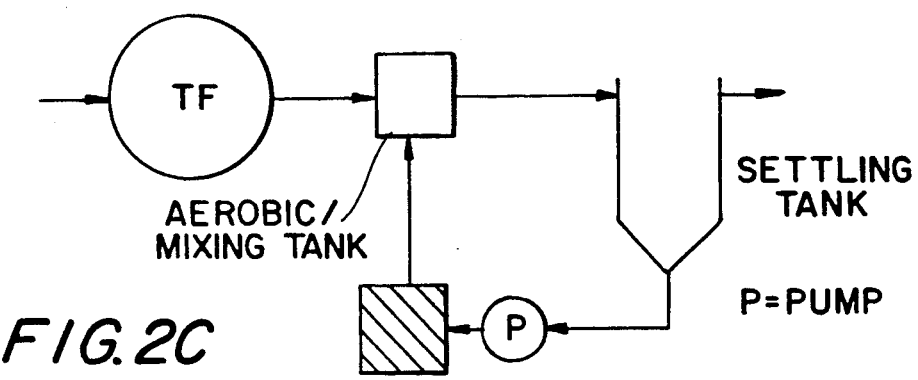
FIG.2C UNIT 3 TRICKING FILTER+AEROBIC/MIXING TANK + SETTLING TANK+ ANOXIC/ANAEROBIC TREATMENT

WASTEWATER TREATMENT PROCESS

FIELD OF THE INVENTION

This invention relates broadly to process improvements in trickling filter wastewater treatment processes. More specifically, this invention relates to methods for improving the efficiency of solids removal in trickling filter/solids contact processes. Yet more specifically, this invention relates to the conduct of such processes in order to substantially improve the efficiency of the removal of suspended solids and the reduction of biochemical oxygen demand in existing processes.

BACKGROUND OF THE INVENTION

Trickling filter wastewater processes include the step of passing wastewater in a downward flow system in contact with biomass attached to a filter medium. A sufficient contact time between the wastewater and the filter medium is provided for the adsorption of soluble and colloidal material into the biomass. As a result of the oxidation or oxidative respiration step, new biomass is created. In addition, the biomass is reduced by endogenous respiration.

Trickling filter wastewater treatment processes are easy to operate and maintain, and are considered energy efficient relative to activated sludge processes because they do not need an expensive air supply. However, effluent quality is not consistently high, typically containing 20 to 40 mg/l of biochemical oxygen demand (BOD) and suspended solids (SS).

Although trickling filters were the most frequently used secondary wastewater treatment process until the 1940's, the application of trickling filters has gradually decreased in recent years due to an inability to meet a 30 day-30 mg/l $BOD_5$ and SS standard. This is mainly due to a high effluent SS. In order to provide a high quality effluent, efficient removal of solids from the trickling filter effluent is necessary.

Many process modifications have been used to improve the performance of trickling filters. One such alternative is to replace the trickling filter with the activated sludge process or a rotating biological contactor (RBC). A second alternative is to use a tertiary treatment process such as filtration or chemical treatment to polish the effluent of existing trickling filter plants. A third alternative is to replace the existing rock media with plastic media to enhance the performance of the trickling filter. A fourth alternative is to modify the trickling filter process with a coupled activated sludge process. Each of these alternative measures can provide the means to meet the current secondary effluent discharge limitation of 30 mg/l of $BOD_5$ and SS, but each is associated with additional capital and operating costs.

In the early 1980's, Norris et al. [1, 2] and Fedotoff [3] suggested a simple process modification for the trickling filter process to produce a high quality effluent without requiring expensive tertiary or coupled treatment. In this modification, the trickling filter effluent is mixed with return sludge from the final settling tank and further treated in an aeration tank or channel with a short hydraulic retention time. The aerated solids contact sludge is then settled in the final settling tank. These modifications are generally referred to as the Trickling Filter/Solids Contact (TF/SC) process.

The advantages of the TF/SC process modifications of trickling filters according to Norris et al. [1, 2], Fedotoff et al. [3], and Niku et al. [4], include: (1) lower capital cost than full scale activated sludge processes and the rotating biological contactors (RBC), (2) lower operating and maintenance costs, (3) simplicity of operation, (4) ease of biological sludge settling, (5) adaptability to existing trickling filters, and (6) equivalence of performance to the activated sludge process.

TF/SC plants have consistently produced an effluent quality which exceeds that of secondary treatment or comparable tertiary treatment plants. The production of high quality effluent is related to the enhanced flocculation and soluble organic removal property of the aerated solids contact sludge. However, the process kinetics and design parameters of the solids contact step are not fully understood.

As in other biological wastewater treatment processes, the efficiency of treatment attained by the trickling filter is greatly affected by the performance of the final settling tank. Most of the dissolved organic matter and colloidal solids in wastewaters applied to trickling filters are rendered settleable by adsorption and biological flocculation on the trickling filter biological film. The film itself is modified by decomposition and the net removal of solids in wastewater is varied and related to the biomass holding capacity in the filter. In spite of its importance, information on the sludge settling step in the trickling filter is extremely limited compared to that of the activated sludge process.

It is known that the flocculation of biological sludge is affected by various physical, electrochemical, and biochemical factors. The physical factors include the size of floc, degree of agitation in the system, surface area of floc, bound water, and solids concentration. The electrochemical factor includes the surface charge of flocs. The polymer content in the sludge represents the biochemical factor.

Although flocculation is closely related to the sludge settleability, there is no direct way to substantiate the degree of flocculation in the biological sludge. Sludge volume index (SVI), which represents the sludge settleability, is actually a measure of settled sludge volume as a result of the complex flocculation and compaction interaction during the settling process. Although the importance of polymeric material to sludge settleability has been recognized in the activated sludge process, study of the effect of polymeric material on sludge settleability in the trickling filter process has been limited.

OBJECTS OF THE INVENTION

It is thus a primary object of this invention to improve the efficiency of operation of trickling filter wastewater treatment processes.

It is a further and related object of this invention to improve Trickling Filter/Solids Contact processes.

It is still a further and related object of this invention to improve trickling filter processes by improving the efficiency of removal of solids from trickling filter effluents.

It is still a further and related object of this invention to improve the sludge-settling step of trickling filter wastewater treatment processes by identification of process parameters and operating conditions so that higher quality effluents can be obtained.

It is still a further object of this invention to provide process modifications for existing trickling filter processes and existing Trickling Filter/Solids Contact processes which enable such plants to meet or exceed BOD and SS standards.

It is still a further object of this invention to provide process modifications for existing trickling filter processes and existing Trickling Filter/Solids Contact processes which enable such plants to meet or exceed nitrogen and phosphate standards.

BRIEF DESCRIPTION OF THE INVENTION

The invention is broadly in methods for increasing the settleability of suspended solids in the effluent of trickling filter processes including those wherein trickling filters are part of a solids contact process. Broadly, the invention is in the discovery that if sludge obtained from the settling of suspended solids is retained in an anoxic/anaerobic zone for a period of time sufficient to increase the extracellular polymer contained therein, and thereafter is contacted with effluent from the trickling filter under mixing and aerobic conditions, settleability of suspended solids and reduction of biological oxygen demand (BOD) are substantially improved. It has also been found that nitrogen and/or phosphorus may be removed from the wastewater as well as improving the settleability of suspended solids and reducing BOD in purified wastewater by mixing the sludge from the anoxic/anaerobic zone with effluent from the trickling filter or activated sludge, or, from an intermediate settling step, in an anoxic premixing zone and thereafter subjecting the mixed sludges to aerobic mixing conditions.

The invention provides great flexibility in the modification of existing trickling filter and trickling filter solids contact processes or activated sludge in that an anoxic/anaerobic zone can be installed for the processing of recycled sludge or intermediate sludge produced in the process, the sludge from the anoxic/anaerobic zone being mixed with effluent from the trickling filter or from an intermediate settlement step in the aerobic/-mixing zone or in an anoxic premixing zone upstream of the aerobic/mixing zone. The process accordingly can be used in existing plants or new plants with the substantial improvement of solids settleability, the reduction of BOD, and, by the inclusion of the anoxic premixing zone upstream of the aerobic/mixing zone, nitrogen and phosphorus values in the wastewater can be reduced.

BRIEF DESCRIPTION OF THE DRAWINGS

FIGS. 2A, 2B and 2C are schematic diagrams of three alternative trickling filter effluent treatment processes including that of the invention.

DETAILED DESCRIPTION OF THE INVENTION

Figure 1:
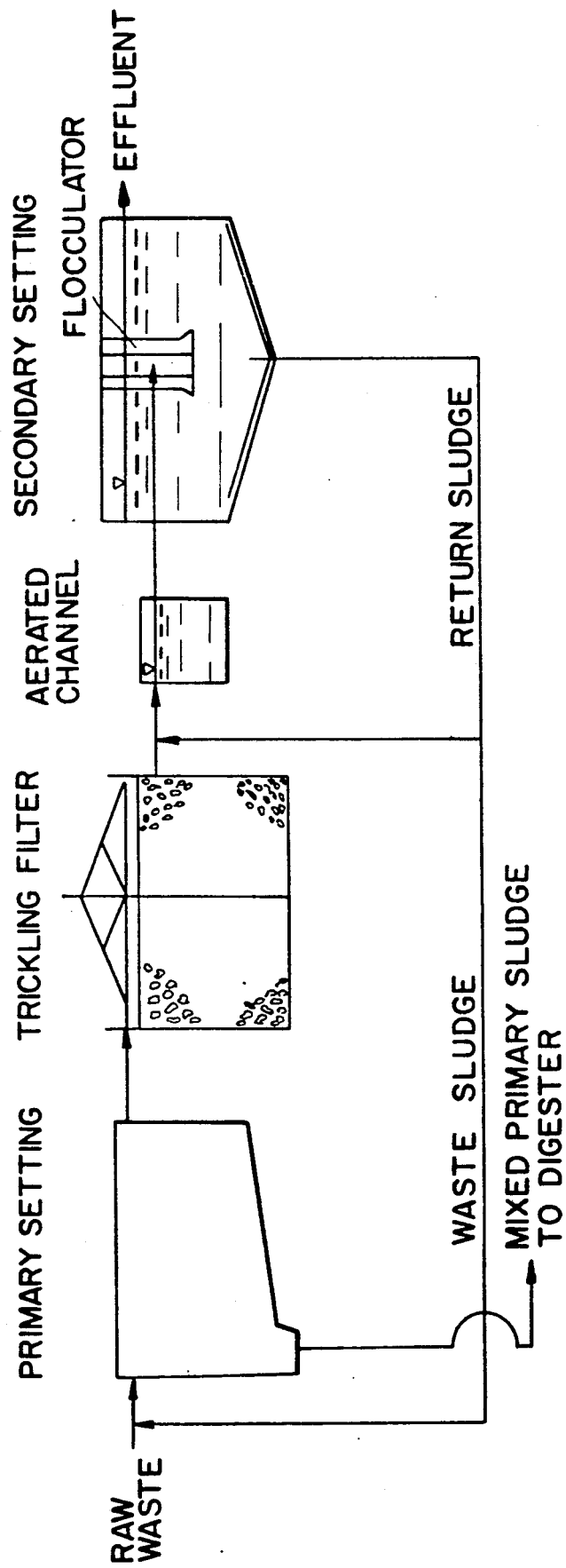
FIG. 1 is a schematic diagram of trickling filter/solids contact process.

The invention relates broadly to wastewater treatment processes and more specifically to such processes which employ trickling filters or trickling filters as part of a solids contact process. FIG. 1 sets forth a schematic diagram for such a trickling filter/solids contact process as is known in the art.

It has now been found, broadly, that the settleability of suspended solids in the effluent of such processes can be substantially improved and that the biochemical oxygen demand (BOD) in the purified wastewater can be substantially reduced in a process wherein sludge from said process is retained in an anoxic/anaerobic zone (as defined below) for a time sufficient to improve the settling characteristics of the suspended solids in the effluent of the process plant, and thereafter contacting the sludge from the anoxic/anaerobic zone with effluent from the trickling filter under mixing and aerobic conditions (as defined below).

Figure 11:
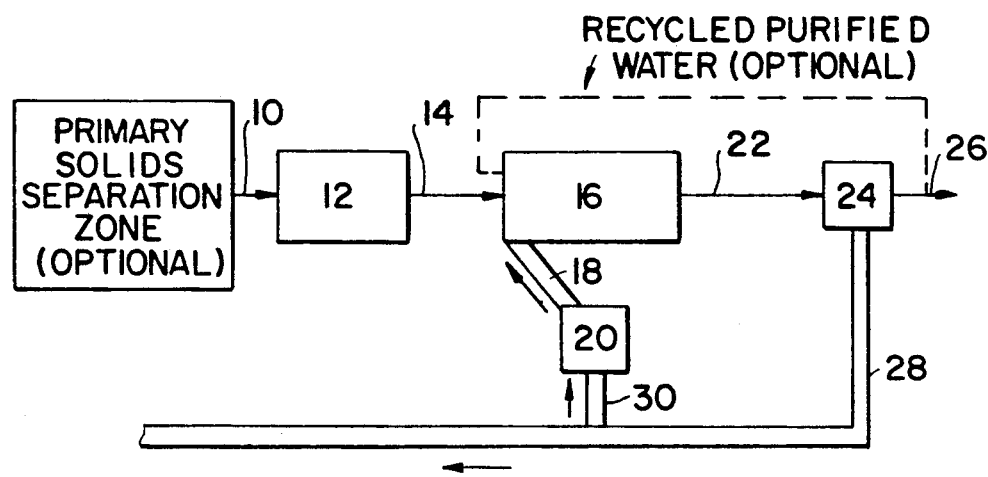
FIG. 11 is a schematic process diagram of a preferred process incorporating the invention.

In a preferred embodiment of the process, as depicted in FIG. 11, wastewater containing suspended solids and biodegradable organic substances is conveyed through line 10 through aerobic biological oxidation zone 12 wherein a portion of the BOD is converted into additional suspended solids. The effluent from aerobic biological oxidation zone 12 is passed via line 14 to aerobic/mixing zone 16 wherein it is mixed with effluent conveyed via line 18 from anoxic/anaerobic zone 20. Effluent from aeration mixing zone 16 passes via line 22 to settling zone 24. Purified wastewater having reduced BOD and suspended solids passes from settling zone 24 via line 26 and sludge, containing suspended solids, passes via line 28. The double lines in FIG. 11 and in FIGS. 12-15 indicate a sludge stream, while the single lines indicate a liquid stream. A portion of the sludge containing suspended solids is recycled via line 30 to anoxic/anaerobic zone 20. In anoxic/anaerobic zone 20, the extracellular polymer content of the sludge is increased and the effluent from zone 20 is recycled via line 18 to the aerobic/mixing zone as described above.

As used throughout, the following terms have the following meanings.

By "aerobic biological oxidation zone" is meant any of the known aerobic biological treatments such as trickling filter and trickling filter solids/contact operations as well as rotating biological filter operations or activated sludge processes. Such aerobic biological oxidation zones include any operation wherein the major thrust is the reduction of BOD by an aerobic biological treatment. Such treatments may include stabilization ponds, lagoons, and ditch oxidation steps.

By "aerobic conditions," i.e., the conditions in the aerobic/mixing zone, are meant aeration oxidation conditions as may be achieved in known process equipment including aerators, mixers, and the like. "Aerobic" means containing a finite amount of dissolved oxygen (DO). Preferred aerobic conditions are those wherein the DO is greater than one mg/liter.

By "anoxic conditions" are meant conditions in which no dissolved oxygen (DO) is present in the bulk liquid, but chemically bound oxygen, as in nitrate, is available to the microbial metabolism.

By "anaerobic conditions" are meant conditions wherein there is no DO in the bulk liquid and wherein nitrate also is absent so that only anaerobic microorganisms can survive.

By "anoxic/anaerobic conditions" are meant conditions which are at least anoxic, i.e., there is no dissolved (free) oxygen but there may or may not be combined oxygen present as nitrate.

The term "settling" as used herein refers broadly to any solids separation process known in the art, e.g., filtering and centrifuging.

In preferred embodiments of the process of FIG. 11, a portion of the purified wastewater may be separated in the settling zone and recycled to the aerobic/mixing zone as a diluent. In another preferred embodiment, the wastewater supplied to the aerobic biological oxidation zone may first be passed through a primary solids separation zone wherein a portion of the suspended solids and BOD is removed. The process conditions within the several treatment zones described in the process of FIG. 11 are set forth in detail before.

Broadly, the ratio of sludge recycled to the anoxic/anaerobic zone to sludge either removed from the process or recycled back to the aerobic biological oxidation zone is in the range of 1:99 to 99:1. Such a broad range imparts great flexibility to the process of the invention.

The ratio of the effluent from the anoxic/anaerobic zone to the effluent from the biological oxidation zone may vary over a broad range provided only that an effective amount of effluent from the anoxic/anaerobic zone is introduced into said aerobic/mixing zone in order to achieve the purposes of the invention.

Figure 12:
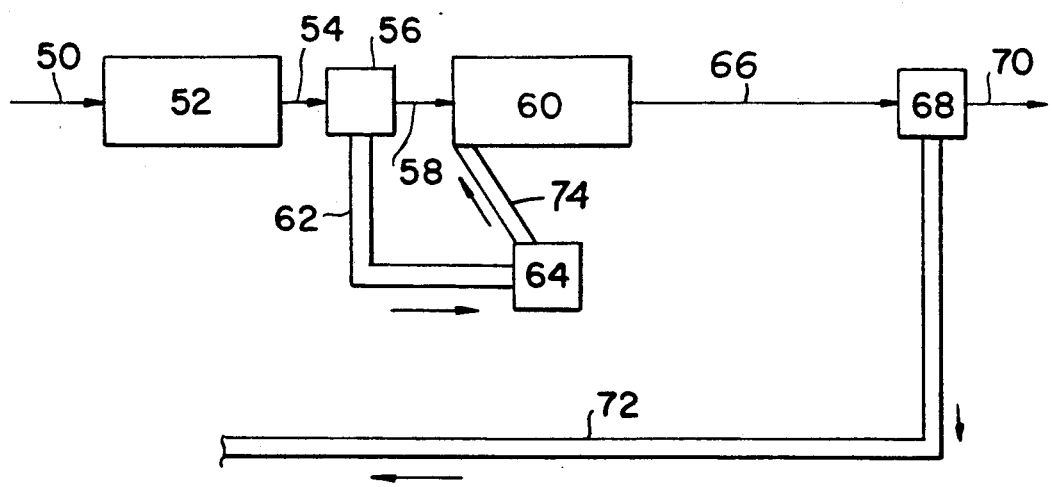
FIG. 12 is a second schematic process diagram of a preferred process incorporating the invention.

Another embodiment of the invention is depicted in FIG. 12. Reference numeral 50 refers to conduit through which wastewater containing suspended solids and biodegradable organic substances is conveyed to aerobic biological oxidation zone 52. In zone 52, a portion of the BOD is converted into additional suspended solids. The effluent from aerobic biological oxidation zone 52 is conveyed via conduit 54 to an intermediate settling zone 56 wherein an intermediate clarified effluent is separated from an intermediate sludge containing suspended solids. The clarified effluent passes via conduit 58 to aerobic/mixing zone 60 and the intermediate sludge is conveyed via conduit 62 to an anoxic/anaerobic zone 64. The effluent from the aerobic/mixing zone 60 passes via conduit 66 to a secondary settling zone 68 wherein purified wastewater having reduced BOD and suspended solids is separated from sludge containing suspended solids. The purified wastewater is conveyed via conduit 70 from secondary settling zone 68 and the sludge containing suspended solids is removed or recycled back to aerobic biological oxidation zone 52 via conduit 72. The intermediate sludge contained in anoxic/anaerobic zone 64 is retained therein for a time sufficient to increase the extracellular polymer content of said sludge, and the effluent from anoxic/anaerobic zone 64 containing an increased extracellular polymer is conveyed via conduit 74 to aerobic/mixing zone 60 wherein it is mixed with the intermediate clarified effluent conveyed via conduit 58. The process conditions within the several treatment zones described in the process of FIG. 12 are set forth in detail below.

Figure 13:
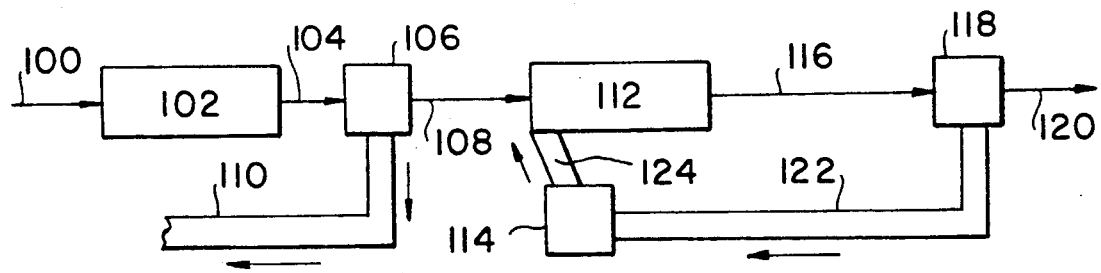
FIG. 13 is a third schematic process diagram of a preferred process incorporating the invention.

In FIG. 13, wastewater is introduced via conduit 100 to aerobic biological oxidation zone 102 wherein a portion of the BOD is converted into suspended solids. The effluent from zone 102 is conveyed via conduit 104 to intermediate settling zone 106, and intermediate clarified effluent is removed from zone 106 via conduit 108 and intermediate sludge containing suspended solids is removed or recycled back to aerobic biological oxidation zone 102 via conduit 110. The intermediate clarified effluent passes to aerobic/mixing zone 112 wherein it is mixed with effluent from anoxic/anaerobic zone 114. The effluent from aerobic/mixing zone 112 is conveyed via line 116 to a secondary settling zone 118. In that zone, purified wastewater having reduced BOD and suspended solids is separated from sludge containing suspended solids. The former is removed via conduit 120 and the latter is recycled to anoxic/anaerobic zone 114 via conduit 122. The sludge containing suspended solid which is introduced into anoxic/anaerobic zone 114 is retained therein for a time sufficient to increase the extracellular polymer content of the sludge and the sludge is thereafter recycled via conduit 124 to anoxic/anaerobic zone 112. The conditions within each of the several zones described in the process of FIG. 13 are further set forth below.

Figure 14:
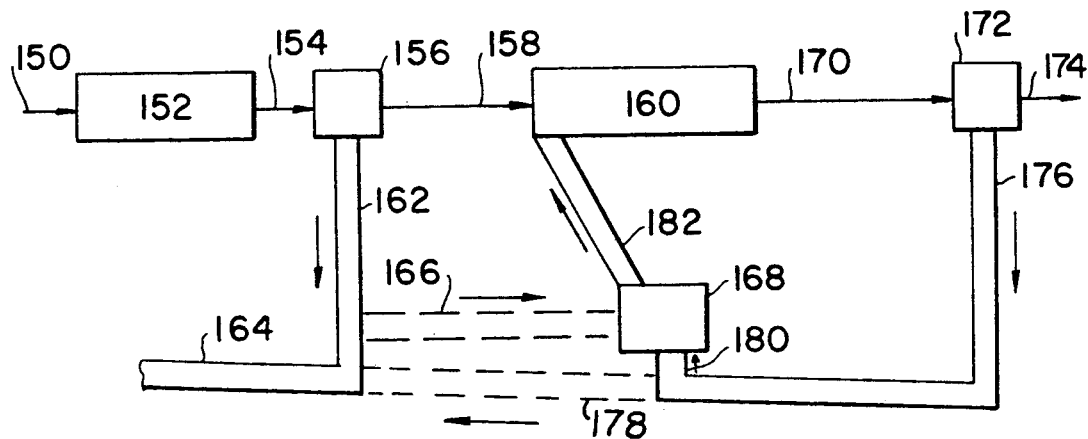
FIG. 14 is a fourth schematic process diagram of a preferred process incorporating the invention.

In FIG. 14, wastewater is introduced via conduit 150 to aerobic biological oxidation zone 152 wherein a portion of the BOD is converted into suspended solids. The effluent from zone 152 passes via conduit 154 to intermediate settling zone 156. An intermediate clarified effluent is conveyed from zone 156 via conduit 158 to aerobic/mixing zone 160. An intermediate sludge containing suspended solids is conveyed via conduit 162. The intermediate sludge (activated sludge) may be conveyed via conduit 164 to waste disposal or be recycled back to the aerobic biological oxidation zone 152 via conduit 164 or may be conveyed via conduit 166 to anoxic/anaerobic zone 168. The effluent of the aerobic/mixing zone 160 is conveyed via conduit 170 to secondary settling zone 172. In zone 172, a purified wastewater having reduced BOD and suspended solids is separated from a secondary sludge containing suspended solids. The former stream is conveyed from the process via conduit 174 and the latter stream is conveyed from secondary settling zone 172 via conduit 176. The secondary sludge may be removed from the process or be recycled back to the aerobic biological oxidation zone 152 via conduits 176, 178, and 164 or may be recycled via conduit 180 to anoxic/anaerobic zone 168 wherein it may be mixed with intermediate sludge containing suspended solids conveyed via conduit 166. The sludge in anoxic/anaerobic zone 168 is retained therein for a time sufficient to increase the extracellular polymer content of such sludge and thereafter is recycled via conduit 182 to aerobic/mixing zone 160 wherein it is mixed with the intermediate clarified effluent in conduit 158. The conditions in the several zones described in FIG. 14 are further set forth below.

Figure 15:
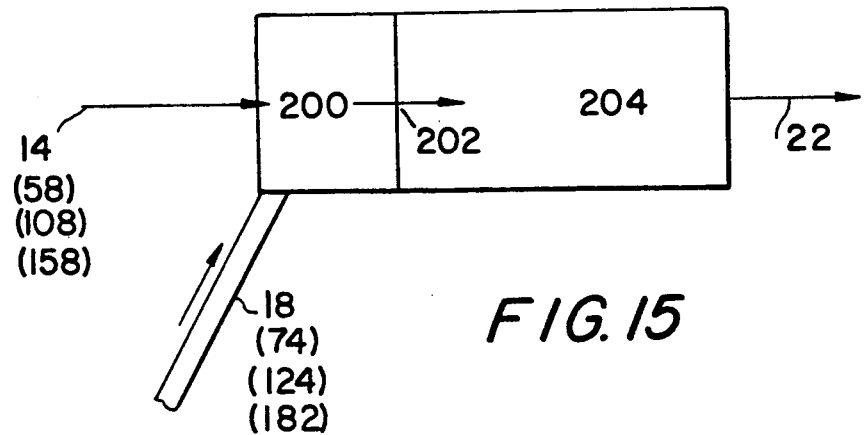
FIG. 15 is a schematic of a preferred process embodiment incorporating the invention.

It is a further and important aspect of the invention that the processes as described above can be further modified by establishing certain conditions in the mixing zone upstream of the aerobic/mixing zone. With reference to FIGS. 11 and 15, it has been found to be advantageous to mix the effluent from the aerobic biological oxidation zone conveyed via conduit 14 with the effluent from the anoxic/anaerobic zone which has increased extracellular polymer content, in an anoxic premixing zone. Such an anoxic premixing zone is designated by reference numeral 200 in FIG. 15. The conduits entering into anoxic premixing zone 200 are conduits 14 and 18 from FIG. 11. By retaining and premixing the sludges in zone 200 for a period of time as further described below in zone 200 and thereafter passing the mixed sludges via conduit 202 to aerobic/mixing zone 204, it has been found that still further important improvements in the solids separation characteristics and further important improvements in reduced BOD and purified wastewater are achieved. The sludge which has been subjected to aerobic/mixing in zone 204 passes via conduit 22 as described above in FIG. 11.

The processes of FIGS. 12, 13, and 14 may all be modified by including the anoxic premixing zone upstream of the aerobic/mixing zone as described above in connection with FIG. 11. Accordingly, the conduits feeding premixing zone 200 may be conduits 58 and 74 as in FIG. 12, conduits 108 and 124 as in FIG. 13, or conduits 158 and 182 as in FIG. 14.

With respect to the processes of FIGS. 11-14, as modified as described in FIG. 15, it has been found that the adapted processes may be effective for the removal of the nutrients nitrogen and phosphorus from waste streams. It is known that aerobic biological oxidation results in the oxidation of nitrogen in the form of ammonia to nitrogen in the form of nitrate. In the instant processes, the nitrate nitrogen can be removed by denitrification to nitrogen gas in the anoxic premixing zone or the anoxic/anaerobic zone.

With respect to phosphorus, its removal starts in the anoxic/anaerobic zone where phosphorus is released from the sludge into the liquid, and its removal ends in the aerobic/mixing zone by incorporation of the phosphorus from the aerobic biological oxidation into the aerobic/mixing biomass.

Accordingly, it is found that a flexible wastewater treatment process can be carried out which not only has improved solids separation characteristics and reduced BOD, but which also effectively removes nitrogen and/or phosphorus values from the wastewater. This is achieved by the process modification described above in connection with FIG. 15. The process can be carried out to effectively improve solids separation characteristics and reduce BOD or it can be carried out to achieve those ends together with the removal of phosphorus or the removal of nitrogen or the removal of phosphorus and nitrogen. Following, in Table 1, are the residence time conditions in the several treatment zones which effect the desired results.

TABLE 1

| | Residence Time in Hours | | | |
|---|---|---|---|---|
| | SS, BOD | SS, BOD, P | SS, BOD, N | SS, BOD, P, N |
| anoxic/ premixing | 0.25-1.5 | 02.5-1.5 | 0.5-3.0 | 0.25-3.0 |
| aerobic/ mixing | 0.25-1.5 | 0.5-2.0 | 0.5-1.5 | 0.5-2.0 |
| anoxic/ anaerobic | 0.25-2.0 | 0.5-2.5 | 1.5-2.5 | 0.5-2.5 |

Figure 9:
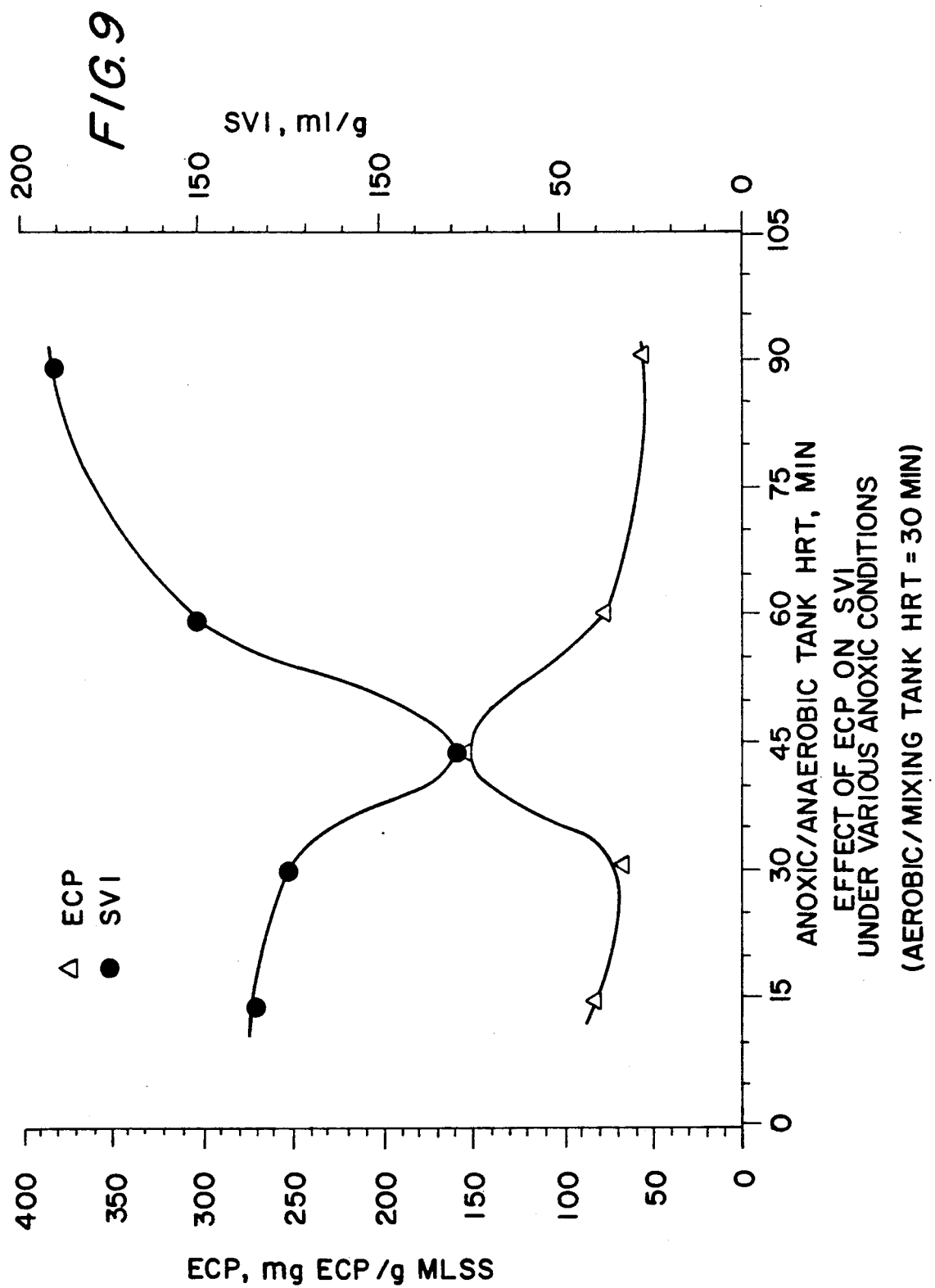
FIG. 9 is a graph of the effect of ECP on SVI under various anoxic conditions.
Figure 10:
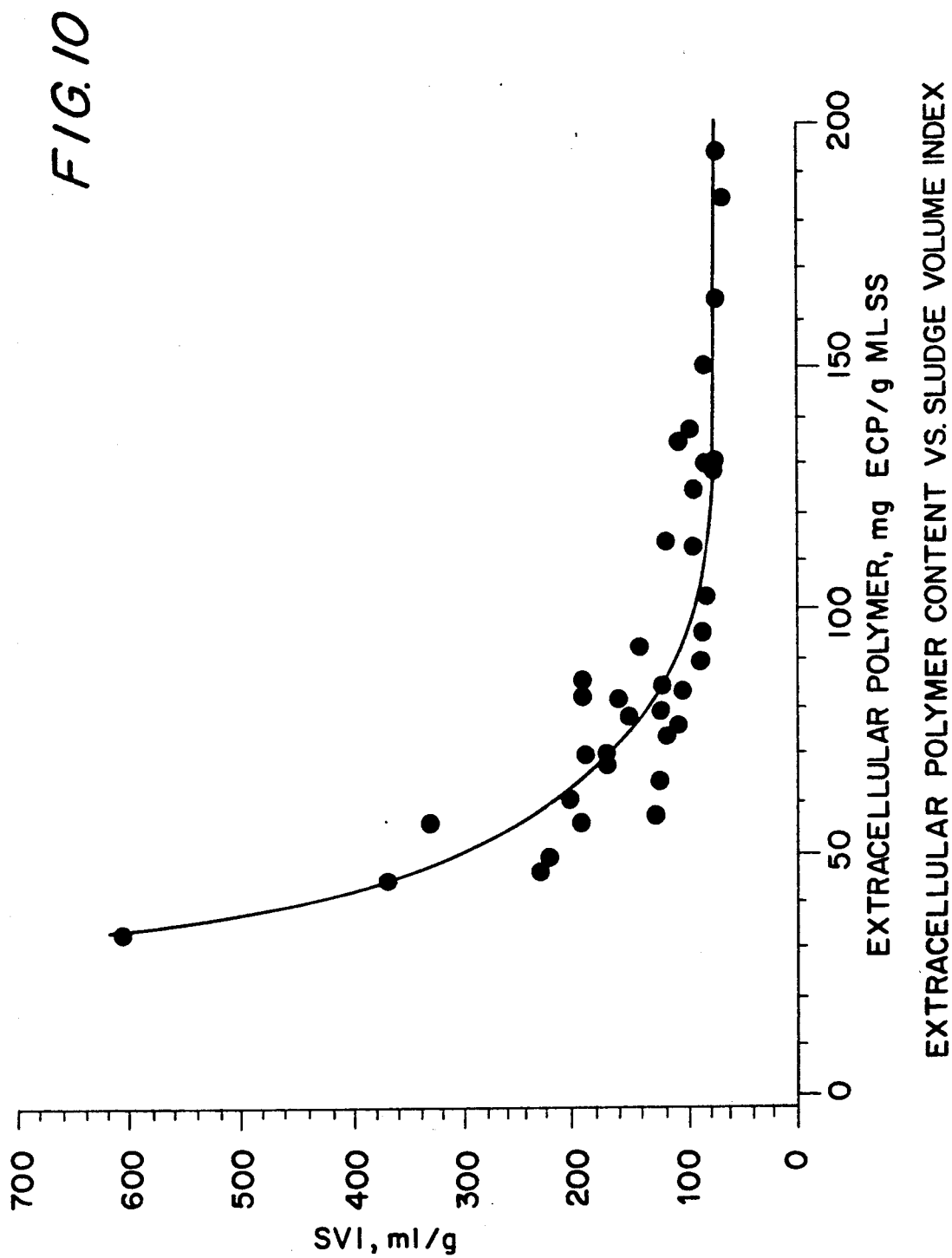
FIG. 10 is a graph of ECP content vs. SVI.

It has now been found that trickling filter sludge settleability is a function of the extracellular polymer and is plotted against the corresponding SVI [Solids Volume Index] data. FIG. 9 shows that a better settling sludge represented by a low SVI has a higher ECP [Extra Cellular Polymer] content. FIG. 10 also indicates that sludge settleability starts to degrade at below 90 mgECP/grMLSS [Mixed Liquor Suspended Solids] and is severely degraded below 60 mgECP/grMLSS. Below 60 mgECP/grMLSS, the change in SVI is very sensitive to change in ECP. It is evident that the ECP content in trickling filter sludge is critical to determining the degree of bioflocculation as measured by SVI.

Effect of the Aerobic/Mixing Tank HRT (Hydraulic Retention Time)

Figure 5:
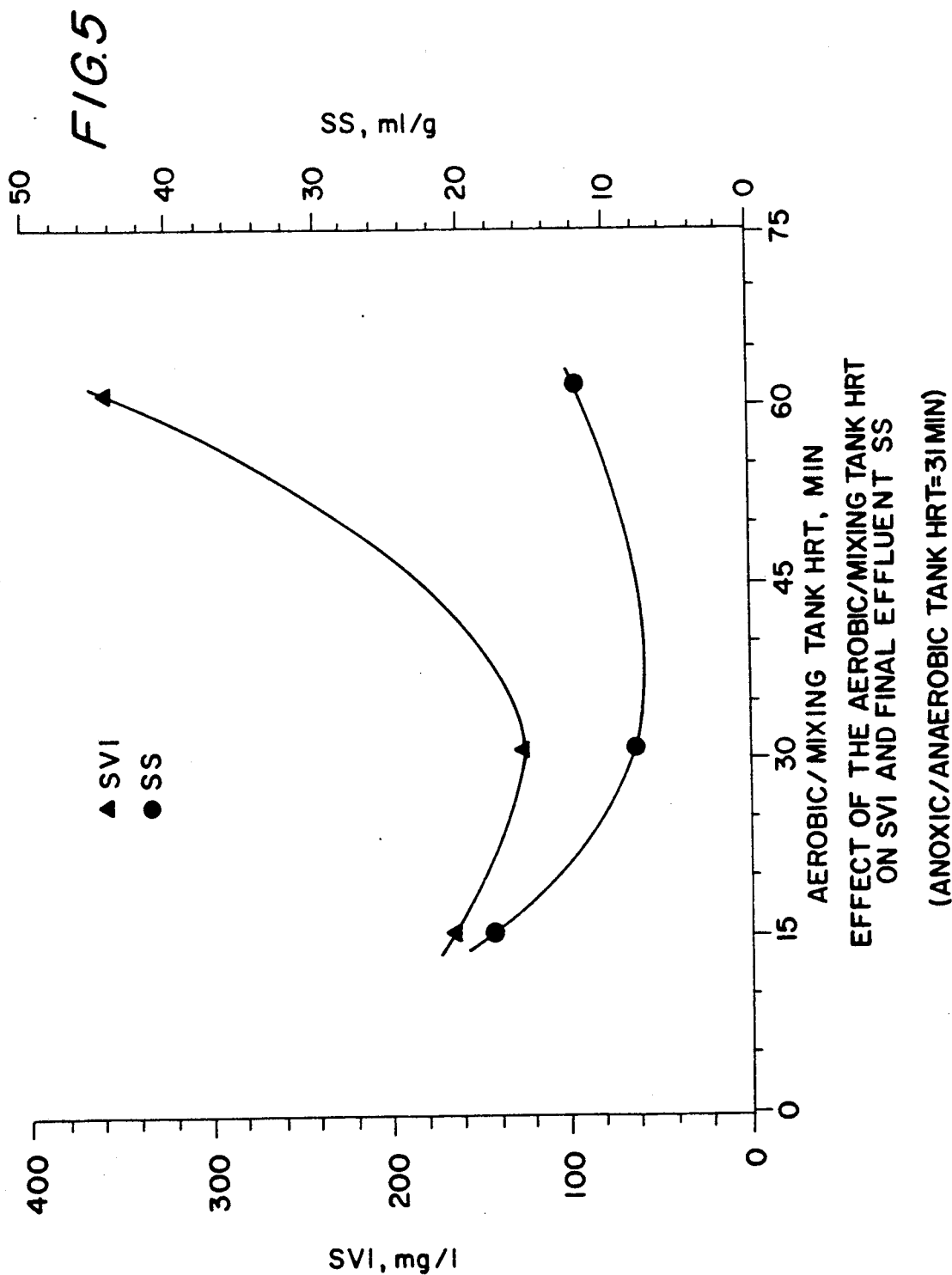
FIG. 5 is a graph of the effect of aerobic/mixing tank HRT on SVI and final effluent SS.
Figure 6:
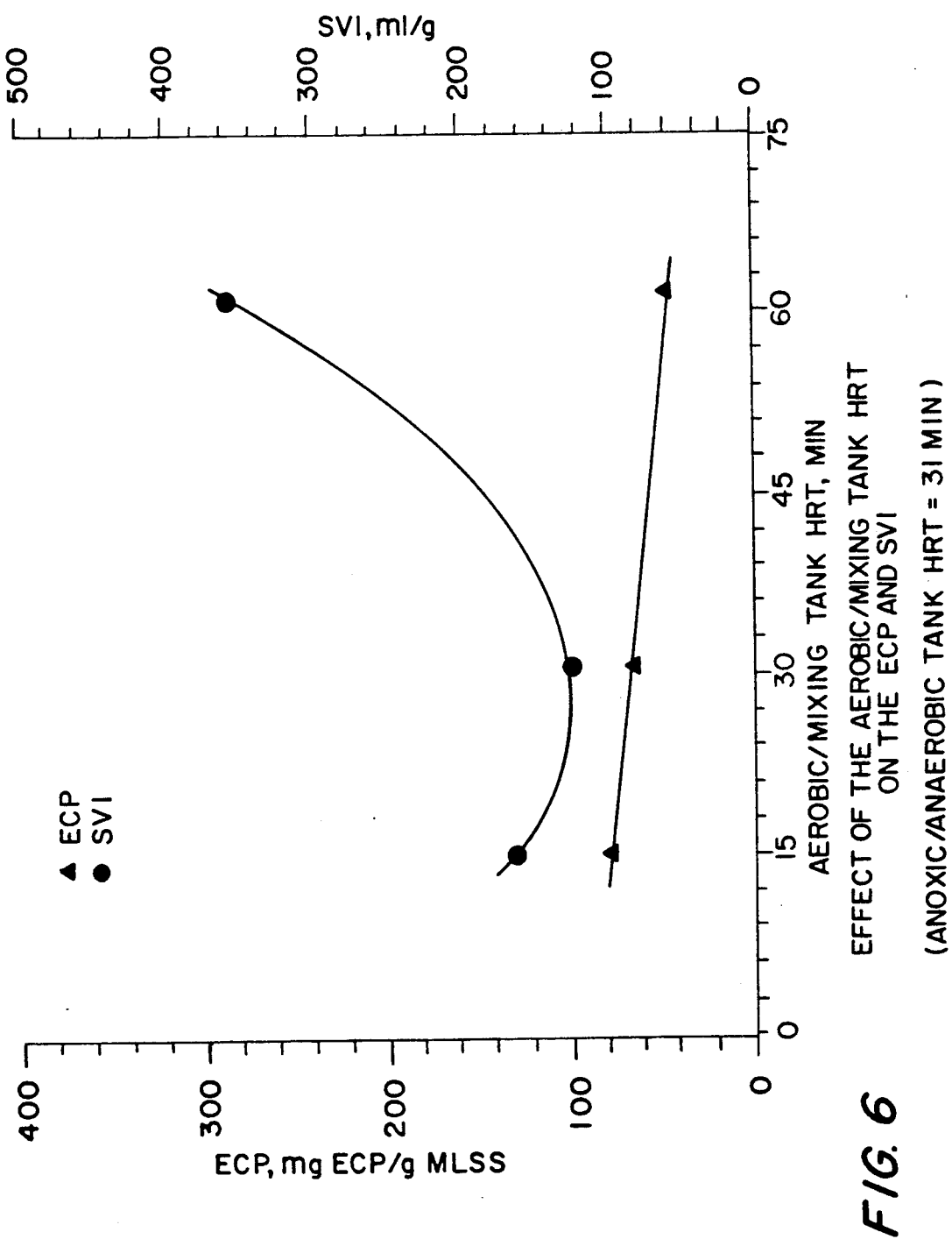
FIG. 6 is a graph of the effect of aerobic/mixing tank HRT on ECP and SVI.

The effect of varying HRT in the aerobic/mixing tank on sludge settleability and effluent quality is shown in FIGS. 5 and 6, which show the relationship between SIV, ECP, and effluent SS when aerobic/mixing tank HRT varies from 15 to 60 minutes. The longer HRT of 60 minutes did not improve the effluent SS [Suspended Solids] or SVI. This may be due to particle breakup caused by extensive aeration as well as a low ECP production in the sludge.

The aerobic/mixing tank HRT of 15.5 minutes produced an effluent SCOD [Soluble Chemical Oxygen Demand] of 39 mg/l (SBOD$_5$ [5-day Soluble Biochemical Oxygen Demand] equivalent of 10 mg/l). SCOD in the effluent where HRT was longer than 30 minutes was less than 30 mg/l (or SBOD$_5$ equivalent of less than 5 mg/l), indicating that most soluble organics in the trickling filter effluent were removed at more than 30 minutes HRT in the aerobic/mixing tank.

Figure 8:
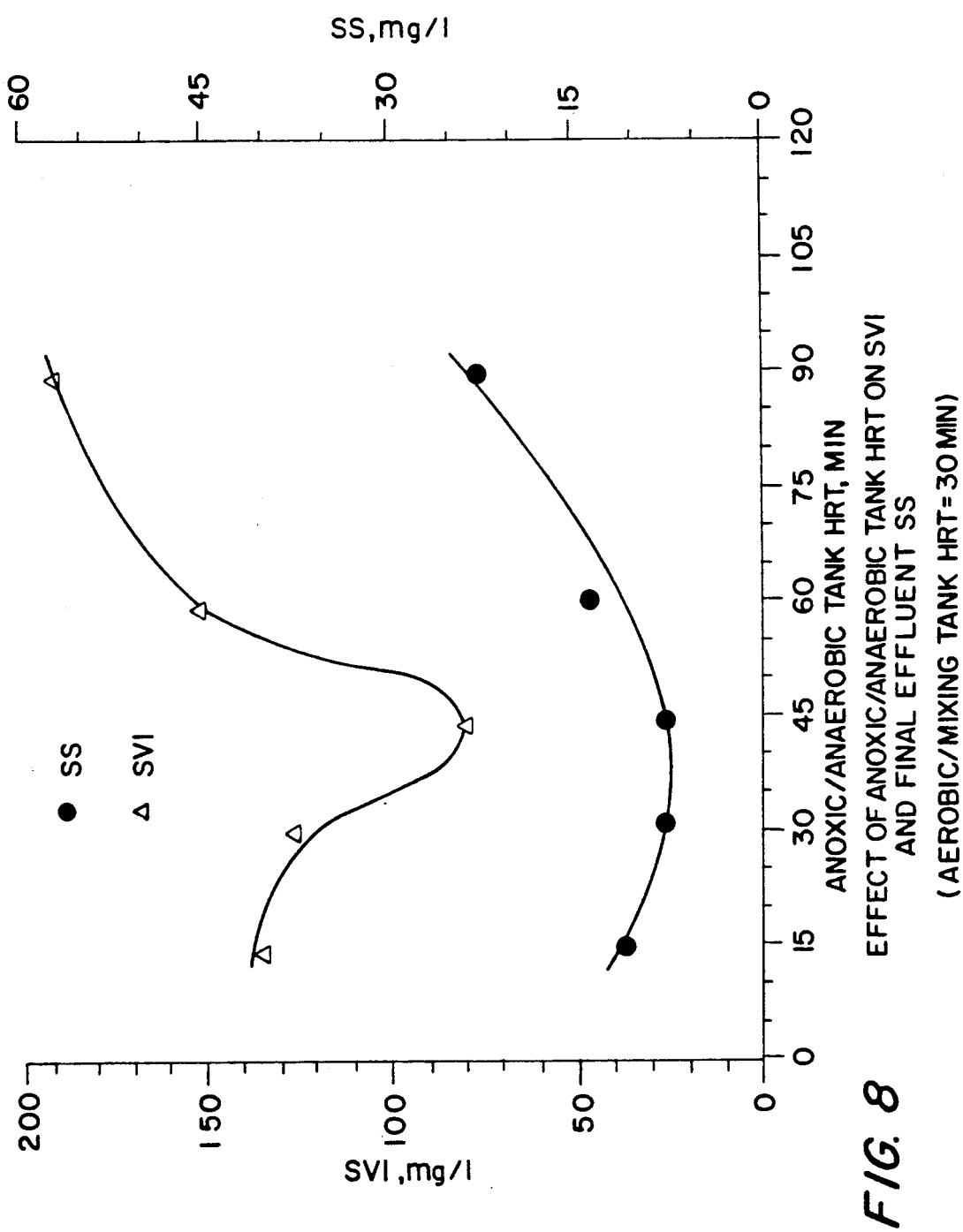
FIG. 8 is a graph of the effect of anoxic/anaerobic tank HRT on SVI and final effluent SS.

A longer aerobic/mixing tank HRT of 62 minutes did not improve the final effluent SS quality. Experimental results showed that the final effluent SS quality was decreased due to a high SVI incorporated with the low ECP content in the sludge. A prolonged aeration period may reduced sludge settleability. Thus the aeration period in the aerobic/mixing tank must be maintained to remove the organics in the trickling filter effluent, i.e., 30 minutes, but a prolonged aeration, i.e., sixty minutes, is to be avoided to prevent the adverse effect on sludge settleability Effect of The Anoxic/Anaerobic Tank HRT The experimental results also demonstrated the positive effect of the addition of anoxic/anaerobic treatment to trickling filter effluent treatment. FIGS. 8 and 9 show the relationship between SVI, ECP, and final effluent SS when various anoxic/anaerobic tank HRTS are used in the effluent treatment process. HRT of the aerobic/mixing tank was maintained at 30 minutes because at 30 minutes most of the soluble organics from the trickling filter effluent could be removed at the organic loading of 41 lb COD [Chemical Oxygen Demand]/d/1000 ft (0.67 kg COD/d/m$^3$). The figures showed that SVI was lowest at 45 minutes of anoxic/anaerobic tank HRT.

Figure 7:
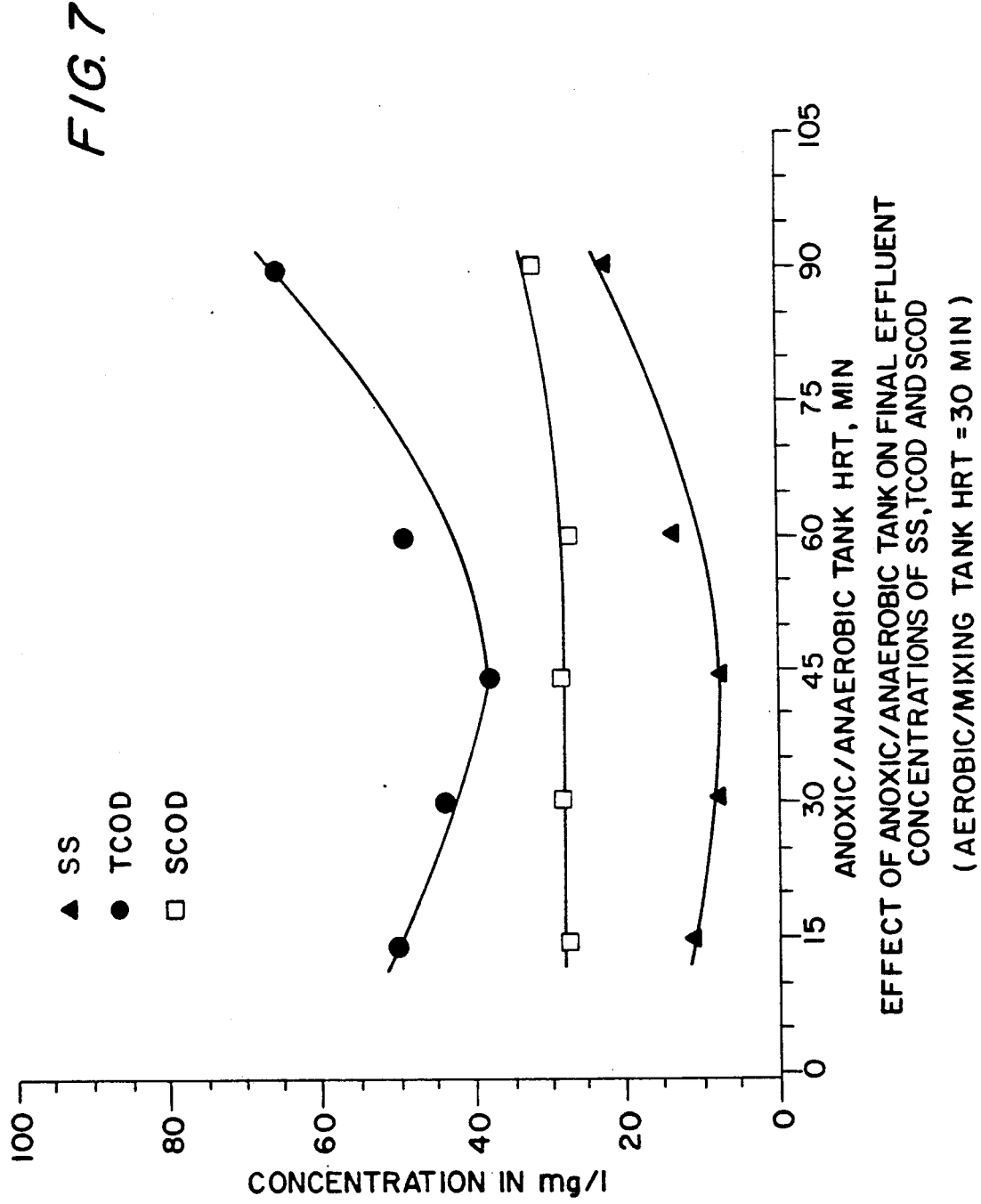
FIG. 7 is a graph of the effect of anoxic/anaerobic tank HRT on final effluent qualities, including concentrations of SS, TCOD, and SCOD.

The better settling sludge due to a better flocculation may be attributed to high ECP content in the sludge. The ECP content was highest at 45 minutes of anoxic/anaerobic tank HRT as shown in FIG. 9. ECP content in the sludge after more than 45 minutes of anoxic/anaerobic tank HRT was not increased. The experimental results indicate that an extensive anoxic/anaerobic treatment does not produce more ECP in the sludge. Sludge settleability at anoxic/anaerobic treatment periods of more than 45 minutes was actually decreased due to the lower ECP content. The decrease in ECP content in the sludge could be a result of degradation of ECP due to the extensive lytic activity associated with hydrolysis of polymeric materials. At 91 minutes of anoxic/anaerobic treatment, the final effluent SCOD was actually increased to 32.2 mg/l, as shown in FIG. 7. The increase in SCOD may be due to the production of refractory materials at prolonged anoxic/anaerobic treatment. Therefore, the results indicate that anoxic/anaerobic tank HRT of less than 45 minutes achieves maximum settling efficiency in association with ECP production.

EXAMPLES

Example 1

Comparison of Trickling Filter Effluent Treatment Process

In order to examine the effectiveness of the aerobic/mixing step and anoxic/anaerobic conditions on the trickling filter effluent treatment, trickling filter effluents were subjected to three different operational conditions:

1. Trickling Filter (TF)+Settling Tank (ST);
2. TF+Aerobic/Mixing Contact Tank (AMT)+ST, and
3. TF+AMT+ST+anoxic/anaerobic treatment of return sludge.

All three flowsheets have a sludge return pump to route the settled sludge from the settling tank to any location in the trickling filter effluent process.

Trickling filter units and settling tanks used throughout the experiment had an identical size and dimension. Schematic diagrams of the trickling effluent treatment processes are illustrated in FIG. 2.

Equipment and Process Conditions

Figure 3:
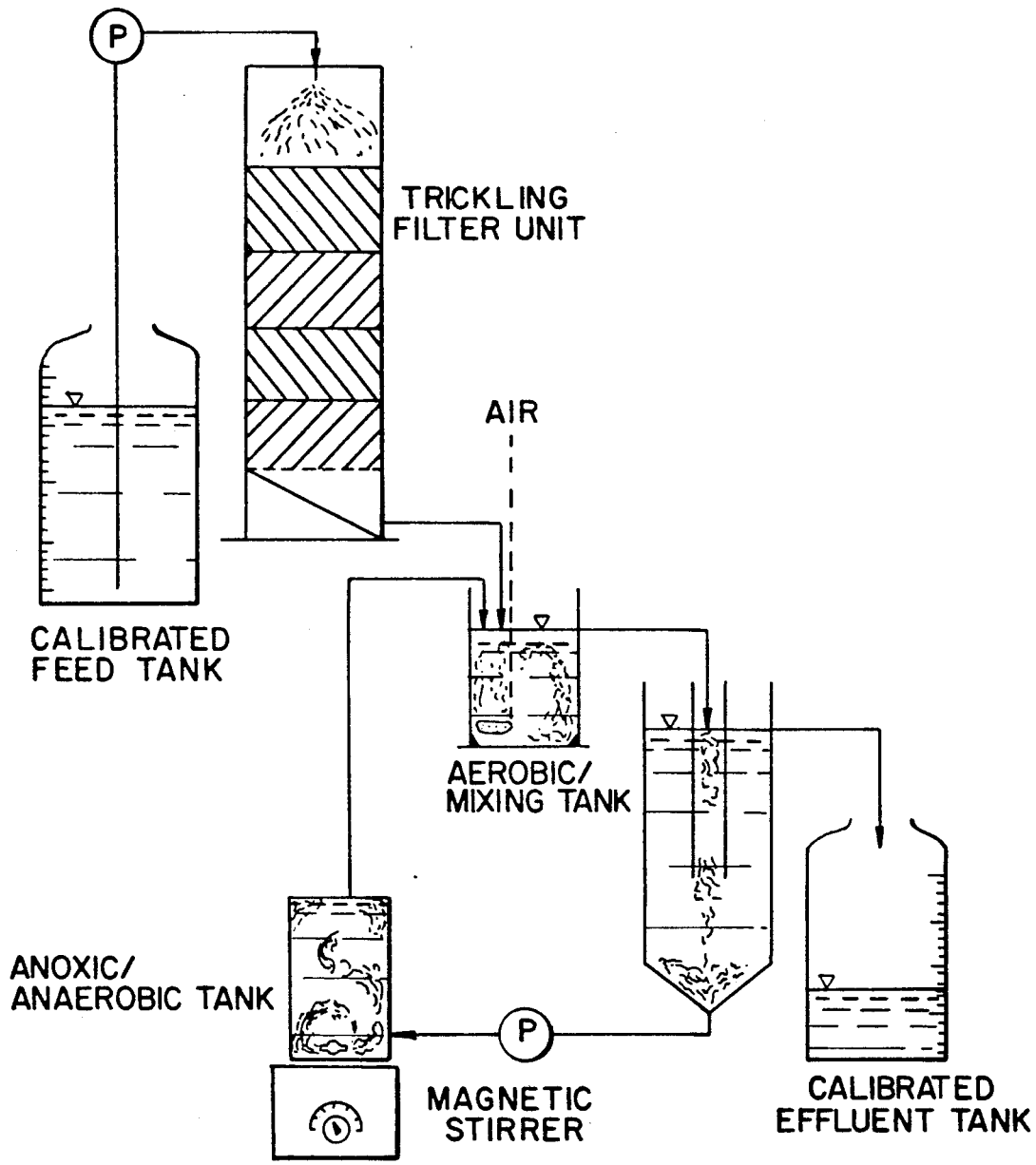
FIG. 3 is a schematic diagram of a laboratory flow scheme for investigating the trickling filter effluent treatment process of the invention.
Figure 4:
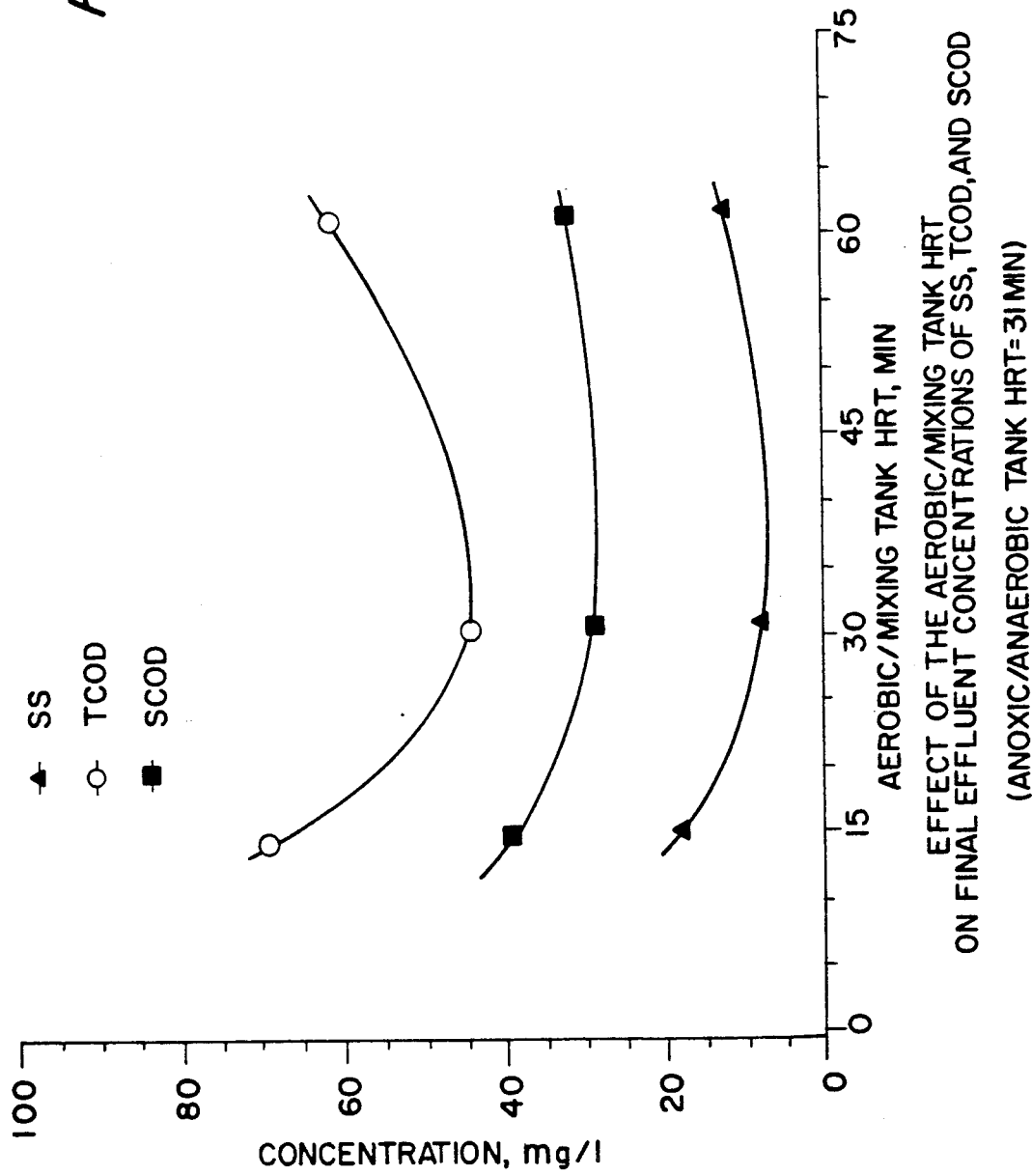
FIG. 4 is a graph of the effect of aerobic/mixing tank HRT on final effluent concentrations of SS, TCOD, and SCOD.

Three identical 1.2 meter (4') high trickling filter units were constructed. FIG. 3 shows the experimental equipment and Table 2 shows the detailed dimensions of the trickling filter unit. The influent wastewater was added to the top of the trickling filter. No effluent flow was recycled. Uniform distribution of feed flow was achieved by installing a flow distributor 15 cm above the media surface. The flow distributor was made of fine mesh nylon screen (0.16 cm or 1/16" opening). Because of the 30 cm of head between the influent inlet and flow distributor, wastewater droplets were impinged at the flow distributor resulting in an even spreading of fine droplets over the cross section of media surface. The flow distributor required cleaning every three days of operation due to an excessive slime growth on the distributor which reduced the effectiveness of even flow distribution. Another feature of the trickling filter unit was the use of fine mesh screen (0.03 cm or 1/32" opening) on the top and bottom of the filter which became necessary after a fly infestation. The screen provided ventilation while preventing the intrusion of flies.

TABLE 2

| Trickling Filter | Media Height | 4 ft (1.22 M) |
|---|---|---|
| | Media Cross Section | 3.0" × 6.0" (0.076 M × 0.102 M) |
| | Total Media Volume | 0.5 ft$^3$ (0.0142 M$^3$) |
| | Filter Body Construction | 1" Acrylic Plates |
| Filter Media | Media Type | Cross Flow PVC Media (BIOdek B 27060) |

TABLE 2-continued

| | |
|---|---|
| Specific Surface Area | 30 ft$^2$/1 ft$^3$ of Media (100 M$^2$/M$^3$) |
| Void Ratio | >95% |
| Weight | 2 lb/1 ft$^3$ (17 Kg/M$^3$) |
| Manufacturer | Munters Corp. |

The enhanced settling properties of the sludge and the kinetics of the treatment steps were investigated in a laboratory flow scheme. The unit included a calibrated feed tank containing the synthetic wastewater for the system and a trickling filter unit. Trickling filter effluent that contains unmetabolized substrates and slough-off biomass is mixed with recycled sludge from an anoxic/anaerobic tank in an aerobic/mixing zone. A settling tank receives the effluent from the aerobic/mixing tank. The supernatant or treated wastewater is collected in the calibrated final effluent reservoir. The settled sludge from the settling tank passes to the anoxic/anaerobic tank.

The anoxic/anaerobic tanks were made of ¼" (0.635 cm) thick clear acrylic plates. Aeration and complete mixing in the aerobic/mixing tank were achieved by an air pump (15 W capacity) and a diffuser stone.

An anoxic/anaerobic process condition was provided by installing the anoxic/anaerobic tank which was made of a 7.62 cm or 3 inch (ID) clear acrylic cylinder. A ⅝ inch (1.5 cm) magnetic bar was placed inside the tank to provide a complete mixing condition. A ⅝ inch (1.6 cm) thick acrylic plate at the bottom of the anoxic/anaerobic tank shielded excess heat from the magnetic stirrer. Two platinum electrodes were inserted on top of the reactor to measure the electrode potential level in the tank.

The settling tank was made of a 10.2 cm or 4 inch (ID) clear acrylic cylinder and a plastic cone was attached on the bottom. A gravity flow scheme was applied in lab units from wastewater inlet to effluent outlet except wastewater feeding and sludge return from the settling tank which were accomplished by multichannel Masterflex pumps (Cole Parmer Model 7567).

The reference organic loadings were based on the plant scale data by Norris and co-workers [1, 2] which showed a maximum loading of 35 lbs BOD$_5$/d/1000 cu ft (0.56 Kg BOD$_5$/D/M$^3$) applied to achieve a BOD$_5$ and SS of less than 10 mg/l. In this study, flow rates of the laboratory trickling filters were maintained to provide the equivalent organic loading of 0.66 Kg COD/d/m3 (BOD5 approximate basis of 0.46 Kg BOD$_5$/d/m$^3$) and hydraulic loading rate of 50 gpd/ft$^2$ (2 m$^3$/d/m$^2$).

Hydraulic retention time (HRT) in the aerobic/mixing tank in units 2 and 3 was maintained initially at 15 minutes, and 15 minutes of HRT were provided to the anoxic/anaerobic tank in unit 3. The feed to the aerobic/mixing tank was one unit of trickling filter effluent mixed with one unit of anoxic/anaerobic tank effluent. Performance of the three units was compared based on the steady state operation data collected over the one-month period.

Steady State Sampling and Experimental Periods

Influent wastewater samples were taken from the calibrated feed tank and trickling filter effluent samples were freshly collected from the trickling filter effluent outlet for analysis. Sludge samples were taken from the aerobic/mixing tank for SVI, ECP, and DO uptake tests. Immediately after the SVI and oxygen uptake rate measurement, the sludges were returned to the system.

Wastewater

A soluble synthetic substrate feed was adopted. The composition of the soluble synthetic wastewater which simulates the composition of domestic wastewater is presented in Table 3. The organic composition of this substrate was used by Symons et al. [13] for the laboratory activated sludge and adopted by Weng and Molof [14] for laboratory fixed-film study as a convenient and easy-to-use formulation approximately representative of the fat, carbohydrate, and protein concentration of domestic sewage. The protein is present as nutrient broth representing 65% of the chemical oxygen demand (COD), the carbohydrate is present as glucose, representing 25% of the COD, and the fatty acid is present as sodium oleate representing 10% of the COD.

TABLE 3

| Synthetic Sewage Substrate [14] | |
|---|---|
| Chemicals | Amount* |
| Nutrient Broth** | 9.0 g |
| Glucose | 3.789 g |
| Sodium Oleate | 0.603 g |
| $NH_4Cl$ | 2.538 g |
| $(NH_4)_2SO_4$ | 0.264 g |
| $CaCl_2.H_2O$ | 0.294 g |
| $MgCl_2.6H_2O$ | 0.407 g |
| $CaSO_4.H_2O$ | 1.350 g |
| $MgSO_4.H_2O$ | 3.650 g |
| $Na_3PO_4.12H_2O$ | 3.650 g |
| $KH_2PO_4$ | 6.434 g |
| $K_2HPO_4$ | 6.430 g |
| $Na_2HPO_4.7H_2O$ | 1.500 g |
| Trace Salts Solution*** | 16.66 ml |
| COD | 360. mg/l* |

*Dilute to 45 l with tap water. COD can be varied with the dilution ratio of tap water and chemical amount
**Bio-Cert Nutrient Broth, Fisher Scientific Co.
***Dilute 5 g of $FeCl_3$—$6H_2O$, 0.672 g of $AlCl_3$—$6H_2O$, 0.342 g of $CoCl_2$—$6H_2O$, 0.15 g of $MnSO_4$—$H_2O$, 0.06 g of $(NH_4)_6$—$Mo_7O_{24}$—$4H_2O$ and 0.01 g of $ZnCl_2$—$H_2O$ to 1 l with distilled water.

Analytical Methods

COD of the samples was measured by the closed reflux colorimetric method according to the Standard Methods [15]. However, samples for COD at low levels were back titrated with standard ferrous ammonium sulfate solution with the ferroin indicator.

SS concentration in the samples was measured according to Standard Methods [15]. Whatman grade 934AH glass fiber filters which has 47 mm diameter and nominal pore size of 1.2 $\mu M$ were used. The Drying oven (Precision Scientific, Model 18) maintained the temperature of 103° C. ($\pm 1°$ C.). Volatile suspended solids (VSS) was measured by using a muffle furnance (Thermolyne Model F-A1738, Cybron Corp.) at 550° C. A gravitational analysis was performed by a laboratory balance (Mettler Model Type 15).

The analytical method to determine the ECP content in the anoxic/anaerobic sludge sample has been subject to intensive research [16, 17, 18] and various modifications have been developed [5, 6, 7, 8, 9, 10, 11, 12, 16, 17]. The analytical measurement of the extracellular polymeric materials from the sludge samples was performed based on the gravitational measurement of solvent insoluble biological polymers after a centrifugation and ultrasonic treatment of sludge. The testing technique is described as follows. Forty ml of the sludge sample are taken from each reactor and carefully placed in IEC centrifugation tubes (50 ml capacity) using a wide mouth pipette. The sample tubes are placed in a high speed centrifuge (ICE Model HT) and centrifuged 15 minutes at 2700 G. The supernatant is carefully discarded from the tubes and remaining solids are resuspended with distilled water to 40 ml. The resuspended sludges are carefully transferred to 100 ml glass beakers and the sludge is sonicated with an ultrasonicator (Heat System-Ultrasonic Inc., Model W200) at 20 W output power rating for 10 minutes. A drop of the sonicated sludge is removed from the beaker to examine the viability of microorganisms using the microscope. Immediately after the microscope examination, the sludge is transferred to centrifugal tubes and centrifuges for 10 more minutes at 7000 G. The sludges are carefully transferred to 250 ml Erlenmeyer flasks and 80 ml of acetone and ethyl alcohol mixture (1:1) is added. The flasks are thoroughly mixed. The caps are tightened and the flasks are placed in a 5° C. refrigerator overnight. After the refrigeration, the insoluble precipitates are filters through a glass fiber filter (Whatman AH937, 47 mm diameter) and the filter paper is placed in an aluminum tin and covered with a Petri dish. This is dried at 80° C. for 1 hour in a drying oven (Precision Scientific, Model 18). (During the drying step in the 80° C. convection oven, the filter paper must be placed inside a Petri dish to prevent possible loss of ECP due to hot air convection.) The solvent insoluble extracellular polymer (ECP) that is trapped in the glass fiber filter is analyzed by an analytical balance (Mettler, Model Type 15).

The sludge volume index (SVI) is the volume in ml occupied by 1 g of suspension after 30 minutes settling. Due to the limited sample volume, the SVI test was performed by using a 100 ml graduated cylinder (Kimax grand, Fisher Cat. #08-554E). The SVI data taken from 100 ml cylinder is slightly higher than that of the standard SVI test using a 1 l graduated cylinder.

The BOD test procedure used was that recommended by *Standard Methods* [15]. Each BOD test was performed with a nitrification inhibitor and the glucose-glutamic acid solution as a reference standard.

Start-up Operation

To initiate biofilm growth, on the filter media, an activated sludge seed sample was taken from the Rockland County, New York Wastewater Treatment Plant, mixed with the synthetic wastewater and fed to the laboratory trickling filters. The biofilm growth was visible after 3 days of operation and color of the biofilm was yellow to light brown. Initial influent COD and flow rate were kept at approximately 200 mg/l and 20 lpd, respectively. The media surfaces in the trickling filters were eventually covered with dark brown biofilm during 4 weeks of operation. The influent COD concentration and flow rate were increased to 400 mg/l and 24 lpd, respectively, for the steady state operation as described previously. The microscopic examination of trickling filter effluents using 100 magnification indicated that protozoa (free swimming ciliates and stalked ciliates) as well as some filamentous microorganisms were present. The trickling filter effluent was subject to various treatment conditions as described in the experimental procedures.

Comparison of Trickling Filter Effluent Treatment Processes

The schematic flow diagrams for units 1, 2, and 3 are illustrated in FIG. 2. The laboratory unit 1 represented a single stage trickling filter system and ran as a control unit. An aerobic/mixing tank was added to the trickling filter in laboratory unit 2 to simulate a Trickling Filter/Solids Contact process. An anoxic/anaerobic tank in addition to the aerobic/mixing tank was included in the laboratory unit 3 to examine the effect of anoxic/anaerobic conditions in the trickling filter effluent treatment.

Throughout the experiment, the hydraulic loading rates were kept at 40.2 to 41.2 gpd/ft$^2$ (2.03 to 2.05 m$_3$/d/m$_2$) by adjusting flow rates to 23.6 to 23.9 lpd (6.2 to 6.3 gpd). Influent COD to the trickling filter was initially kept at approximately 200 mg/l for the acclimation but was increased to the approximately 400 mg/l range for the normal operation. Thus, organic loadings of the trickling filters during the steady state operation were in the range of 0.44 to 0.46 kg COD/d/m$_3$ (49.8 to 50.4 lb COD/d/1000 ft$_3$). The hydraulic retention time (HRT) in the aerobic/mixing tanks in units 2 and 3 was maintained at 15 minutes, and HRT in the anoxic/anaerobic tank in unit 3 was also 15 minutes. Detailed operational conditions are summarized in Table 4.

TABLE 4

Operational COnditions of Trickling Filter Effluent Treatment Experiment

| | | Unit 1<br>TF +<br>ST | Unit 2<br>TF + AMT +<br>ST | Unit 3<br>TF + AMT +<br>AT + ST |
|---|---|---|---|---|
| operating temp. °C. | | 25.29 | 25.29 | 25.29 |
| avg. flow rate | | 23.85 | 23.55 | 23.73 |
| liter/day (gpd) | | (6.30) | (6.22) | (6.27) |
| avg. daily organic loading. kgCOD/d/m$^3$ (lb COD/d/1000 cuft) | | 0.660<br>(41.19) | 0.652<br>(40.67) | 0.657<br>(40.98) |
| avg. daily hydraulic loading. m$^3$/d/m$^2$ (gpd/sqft) | | 2.054<br>(50.41) | 2.028<br>(49.78) | 2.044<br>(50.16) |
| aerobic/<br>mixing<br>tank | vol, ml<br>HRT, min. | N/A<br>N/A | 250<br>15.3 | 250<br>15.2 |
| anoxic/<br>anaerobic<br>tank | vol, ml<br>HRT, min. | N/A<br>N/A | N/A<br>N/A | 250<br>15.2 |

TF = trickling filter
ST = settling tank
AMT = aerobic/mixing tank
AT = anoxic/anaerobic tank The experimental results obtained from the trickling filter effluent treatment processes are summarized in Table 5. Each listed value represents the mean of 7 experimental data points.

TABLE 5

Operational Results of The Trickling Filter Effluent Treatment Experiment

| | | Unit 1 | Unit 2 | Unit 3 |
|---|---|---|---|---|
| aerobic/mixing tank HRT, min. | | N/A | 15.3 | 15.2 |
| anoxic/anaerobic tank HRT, min. | | N/A | N/A | 15.2 |
| influent COD, mg/l | | 392.0 | 392.0 | 392.0 |
| trickling filter effluent | SS, mg/l | 79.9 | 90.0 | 94.6 |
| | TCOD, mg/l | 177.4 | 208.1 | 208.0 |
| | SCOD, mg/l | 83.2 | 87.7 | 82.5 |
| final effluent | SS, mg/l | 24.3 | 9.74 | 7.07 |
| | TCOD, mg/l | 92.6 | 55.8 | 30.1 |
| | SCOD, mg/l | 66.0 | 38.7 | 22.1 |
| SVl. ml/g | | N/A | 82.5 | 78.5 |

N/A = not available

The soluble COD (SCOD) concentration in the trickling filter effluents remained consistently in the range of 83 to 88 mg/l, indicating that the soluble organic removal rates of the three trickling filter units were comparable. However, total COD (TCOD) and SS concentrations in the trickling filter effluents varied from 177 to 208 mg/l, and 80 to 95 mg/l, respectively. The variation of trickling filter effluent SS and TCOD indicates that rates of biofilm slough-off in the three trickling filter units were at different levels under the identical trickling filter operational conditions. The results also suggest that the final settling tank in the trickling filter plant could receive a varying solids loading under the same organic and hydraulic loading condition. Therefore, the successful operation of final settling tanks in trickling filter plants would depend on good flocculating sludge as well as proper settling tank design to offset the fluctuation of solids loading under the normal operating condition.

SCOD and SS removal efficiencies of the three different effluent treatment processes were calculated and are shown in Table 6.

TABLE 6

% COD and % SS Removal Efficiencies At Various Effluent Treatment Conditions

| | Unit 1<br>TF +<br>ST | Unit 2<br>TF +<br>AMT + ST | Unit 3<br>TF + AMT +<br>ST + AT |
|---|---|---|---|
| TF Inf. COD. mg/l | 392.0 | 392.0 | 392.0 |
| TF Eff. SCOD, mg/l | 83.2 | 87.6 | 82.5 |
| % SCOD removal at TF plant | 78.8 | 77.6 | 79.0 |
| final Eff. SCOD mg/l | 66.0 | 38.7 | 22.1 |
| % SCOD removal during TF effluent treatment | 20.7 | 55.9 | 73.2 |
| total % SCOD removal | 83.2 | 90.1 | 94.4 |
| TF eff. SS, mg/l | 79.9 | 90.0 | 94.6 |
| final eff. SS, mg/l | 24.3 | 9.74 | 7.07 |
| total % SS removal during TF effluent treatment | 69.9 | 89.2 | 92.5 |

TF = trickling filter
ST = settling tank
AMT = aerobic/mixing tank
AT = anoxic/anaerobic tank The trickling filters have a similar SCOD removal efficiency in the 83 to 88% range. However, the SCOD removal efficiency of the three effluent treatment methods were markedly different. For example, the control unit 1 which has the settling tank as the only effluent treatment, shows only 20.7% of SCOD removal which is calculated on a trickling filter effluent basis (83.2 mg/l was reduced to 66.0 mg/l). Conversely, approximately 21% of unmetabolized organics in the trickling filter effluent is reduced by microorganisms during the settling periods.

However, SCOD removal efficiency during the aeration step in laboratory unit 2 was at 55.9% on a trickling filter effluent SCOD basis. An additional 35% of SCOD in the trickling filter effluent was reduced by the 15 minute aeration over and above the 21% of trickling filter effluent SCOD removed by the settling tank.

SCOD removal during the aeration step with an anoxic/anaerobic treatment was a superior 73.2% on a trickling filter effluent basis. Addition of an anoxic/anaerobic treatment step in unit 3 reduced SCOD an additional 17% compared to unit 2. The results demonstrate that SCOD in the trickling filter effluent was reduced by the sludge developed during the 15 minutes of anoxic/anaerobic treatment step in addition to the aerobic/mixing step.

The positive effect of anoxic/anaerobic treatment is also seen in the removal efficiency of SS. SS removal efficiency during the settling step in the laboratory unit 1 was 69.9% at a final effluent SS of 24.3 mg/l. This barely meets the secondary treatment limitation of 30 mg/l. Units 2 and 3 showed 89.2% and 92.5% SS removal, respectively, indicating that these trickling filter effluent treatment processes produce a much lower SS than the secondary treatment standard of 30 mg/l. SS removal of the unit with an aerobic/mixing step and the anoxic/anaerobic treatment showed the best performance, indicating that the additional anoxic/anaerobic treatment was more effective in reducing SS together with organic removal.

The aerobic/mixing step in units 2 and 3 also positively affected the microbiological quality of the final effluent. During the experiment, the surface of the settling tank in unit 1 showed some fungi and water mold growth. However, settling tanks in the treatment units 2 and 3 showed a brown color and protozoa (stalked ciliates and free swimming ciliates) and high levels of animal species (nematodes). In contrast, settled sludge in the control unit 1 showed a dark brown to black color and microbial species were not as abundant in sludges from units 2 and 3.

The phosphate ($PO_4$-P) levels in the trickling filter effluent, anoxic/anaerobic sludge and final effluent were measured from a filtered sample. The 45 minutes of HRT in the anoxic/anaerobic tank released up to 10.6 mg/l of $PO_4$-P. The released $PO_4$-P was then taken up by the sludge in the aerobic/mixing tank (30 minutes of HRT) and final effluent data showed 11.1 mg/l of $PO_4$-P removed during the effluent treatment process. During the effluent treatment step, 75 mg/l of SCOD ($SBOD_5$ basis of 54 mg/l) was removed. Therefore the metabolic requirement of phosphorus was less than 2 mg/l, indicating that in excess of 8 mg/l of $PO_4$-P was removed during the effluent treatment step.

REFERENCES

1. Norris, D. P., Parker, D. S., Daniels, M. L., and Owens, E. L. 1980. Efficiencies of advanced waste treatment obtained with upgraded trickling filters. *Civil Engineering-ASCE*, 48:96–101.
2. Norris, D. P., Parker, D. S., Daniels, M. L., and Owens, E. L. 1982. High quality trickling filter effluent without tertiary treatment. *J. Wat. Poll. Cont. Fed.*, 54:1087–98.
3. Fedotoff, R. C. 1983. The trickling filter finds new partner. *Water/Engineering & Management*, June:28.
4. Niku, S., et al. 1982. Reliability and stability of trickling filter process. *J. Wat. Poll. Cont. Fed.*, 54:129–34.
5. Forster, C. F. 1971. Separation of activated sludge using natural and synthetic polymers. *Water Pollution Control*, 71:363–66.
6. Wilkinson, J. F. 1958. The extracellular polysaccharides of bacteria. *Bacteriol. Rev.*, 22:46.
7. Tenny, M. W., and Stumm, W. 1965. Chemical flocculation of microorganisms in biological waste treatment. *J. Wat. Poll. Cont. Fed.*, 37:1370–88.
8. Gulas, V., Bond, M., and L. Benefield 1979. Use of exocellular polymers and biological flocculation. *J. Wat. Poll. Cont. Fed.*, 44:414–31.
10. Friedman, B., et al. 1970. Structure of exocellular polymers and their relationships to bacterial flocculation. *J. Bacteriol.*, 98:1328–88.
11. Kiff, R. J. 1978. A study of the factors affecting bioflocculation in the activated sludge process. *Water Pollution Control*, 77:464–70.
12. Harris, R. H., and Mitchell, R. 1975. Inhibition of the bioflocculation of bacteria by biopolymers. *Water Research*, 9:993–99.
13. Symons, J., McKinney, R., and Hassis, H. 1960. A procedure for determination of the biological treatability of industrial wastes. *J. Wat. Poll. Cont. Fed.*, 32:841–52.
14. Weng, C., and Molof, A. H. 1974. Nitrification in the biological fixed-film rotating disk system. *J. Wat. Poll. Cont. Fed.*, 46:1676.
15. 1985. *Standard Methods*. 15th ed. ALPHA-AWWA-WPCF.
16. Geher, R., and Henry, J. G. 1983. Removal of extracellular materials: techniques and pitfalls. *Water Research*, 17:1743–48.
17. Novak, J. E., and Haugan, B. E. 1981. Polymer extraction from activated sludge. *J. Wat. Poll. Contr. Fed.*, 53:1420–24.
18. Brown, M. J., and Lester, J. N. 1980. Comparison of extracellular polymer extraction methods. *Appli. & Environ. Microbiol.*, 40:179–86.

What is claimed is:

1. A wastewater treatment process having the capability of improving solids separation characteristics, reducing biochemical oxygen demand (BOD) in purified wastewater, removing nitrogen, and removing phosphorus, comprising the steps of:
   (1) passing wastewater containing suspended solids and biodegradable organic substances through an aerobic biological oxidation zone and therein oxidizing a portion of the BOD and converting a portion of the BOD into additional suspended solids;
   (2) passing the effluent from said aerobic biological oxidation zone to an a mixing zone, said mixing zone having an anoxic premixing zone and an aerobic mixing zone, and mixing said effluent with effluent from the anoxic/anaerobic zone recited in step (5) below, in said anoxic premixing zone;
   (3) passing the effluent from the anoxic premixing zone to said aerobic/mixing zone;
   (4) passing the effluent from said aerobic/mixing zone to a settling zone and therein separating
      (a) purified wastewater having reduced BOD and suspended solids, and
      (b) sludge containing suspended solids,
   (5) passing a portion of the sludge formed in step (4) to an anoxic/anaerobic zone and therein increasing the extracellular polymer content of said sludge; and
   (6) recycling an effective amount of the effluent from said anoxic/anaerobic zone to the said anoxic premixing zone of said mixing zone.

2. A process a recited in claim 1 adapted to improve solids separation characteristics and to reduce biochemical oxygen demand (BOD) in purified wastewater, wherein the mixture in said anoxic premixing zone is retained therein for from 0.25 to 1.5 hours, the mixture in said aerobic mixing zone is retained therein for from 0.25 to 1.5 hours, and the mixture in said anoxic/anaerobic zone is retained therein for from 0.25 to 2.0 hours.

3. A process as recited in claim 1 adapted to improve solids separation characteristics, reduce biochemical oxygen demand (BOD) in purified wastewater and to remove phosphorus,. wherein the mixture in said anoxic premixing zone is retained therein for from 0.25 to 1.5 hours, the mixture in said aerobic/mixing zone is retained therein for from 0.5 to 2.0 hours, and the mixture in said anoxic/anaerobic zone is retained therein for from 0.5 to 2.5 hours.

4. A process as recited in claim 1 adapted to improve solids separation characteristics, reduce biochemical oxygen demand (BOD) in purified wastewater and to remove nitrogen, wherein the mixture in said anoxic premixing zone is retained therein for from 0.5 to 3.0 hours, the mixture in said aerobic/mixing zone is retained therein for from 0.5 to 1.5 hours, and the mixture in said anoxic/anaerobic zone is retained therein for from 0.5 to 2.5 hours.

5. A process as recited in claim 1 adapted to improve solids separation characteristics, reduce biochemical oxygen demand (BOD) in purified wastewater and to remove phosphorus and nitrogen, wherein the mixture in said anoxic premixing zone is retained therein for from 0.25 to 3.0 hours, the mixture in said aerobic/mixing zone is retained therein for from 0.5 to 2.0 hours, and the mixture in said anoxic/anaerobic zone is retained therein for from 0.5 to 2.5 hours.

6. A wastewater treatment process in accordance with claim 1 wherein effluent from said anoxic/anaerobic zone is mixed with effluent from said main aerobic biological oxidation zone in said anoxic premixing zone for a period of from about 1 to about 30 minutes before being passed to said aerobic/mixing zone.

7. A wastewater treatment process having the capability of improving solids separation characteristics, reducing biochemical oxygen demand (BOD) in purified wastewater, removing nitrogen, and removing phosphorus, comprising the steps of:
(1) passing wastewater containing suspended solids and biodegradable organic substances through an aerobic biological oxidation zone and therein oxidizing a portion of the BOD and converting a portion of the BOD into additional suspended solids;
(2) passing the effluent from said aerobic biological oxidation zone to an intermediate settling zone and therein separating an intermediate clarified effluent and an intermediate sludge containing suspended solids;
(3) passing said intermediate clarified effluent to a mixing zone, said mixing zone having an anoxic premixing zone and an aerobic mixing zone, and mixing said effluent with effluent from the anoxic-/anaerobic zone recited in step (5) below, in said anoxic premixing zone;
(4) passing the effluent from said aerobic/mixing zone to a secondary settling zone and therein separating
(a) purified wastewater having reduced BOD and suspended solids, and
(b) sludge containing suspended solids;
(5) passing the said intermediate sludge formed in step 2 to an anoxic/anaerobic zone and therein increasing the extracellular polymer content of said sludge; and
(6) recycling an effective amount of the effluent from said anoxic/anaerobic zone to the said anoxic premixing zone of said mixing zone.

8. A wastewater treatment process having the capability of improving solids separation characteristics, reducing biochemical oxygen demand (BOD) in purified wastewater, removing nitrogen, and removing phosphorus, comprising the steps of:
(1) passing wastewater containing suspended solids and biodegradable organic substances through an aerobic biological oxidation zone and therein oxidizing a portion of the BOD and converting a portion of the BOD into additional suspended solids;
(2) passing the effluent from said aerobic biological oxidation zone to an intermediate settling zone and therein separating an intermediate clarified effluent and an intermediate sludge containing suspended solids;
(3) passing said intermediate clarified effluent to a mixing zone, said mixing zone having an anoxic premixing zone and an aerobic mixing zone, and mixing said effluent with effluent from the anoxic-/anaerobic zone recited in step (5) below, in said anoxic premixing zone;
(4) passing the effluent from said aerobic/mixing zone to a secondary settling zone and therein separating
(a) purified wastewater having reduced BOD and suspended solids, and
(b) sludge containing suspended solids;
(5) passing a portion of the sludge formed in step (4) to an anoxic/anaerobic zone and therein increasing the extracellular polymer content of said sludge; and
(6) recycling an effective amount of the effluent from said anoxic/anaerobic zone to the said anoxic premixing zone of said mixing zone.

9. A wastewater treatment process having the capability of improving solids separation characteristics, reducing biochemical oxygen demand (BOD) in purified wastewater, removing nitrogen, and removing phosphorus, comprising the steps of:
(1) passing wastewater containing suspended solids and biodegradable organic substances through an aerobic biological oxidation zone and therein oxidizing a portion of the BOD and converting a portion of the BOD into additional suspended solids;
(2) passing the effluent from said aerobic biological oxidation zone to an intermediate settling zone and therein separating an intermediate clarified effluent and an intermediate sludge containing suspended solids;
(3) passing said intermediate clarified effluent to an mixing zone, said mixing zone having an anoxic premixing zone and an aerobic mixing zone, and mixing said effluent with effluent from the anoxic-/anaerobic zone recited in step (5) below, in said anoxic premixing zone;
(4) passing the effluent from said aerobic/mixing zone to a secondary settling zone and therein separating
(a) purified wastewater having reduced BOD and suspended solids, and
(b) secondary sludge containing suspended solids;
(5) passing a portion of the said intermediate sludge formed in step 2 and a portion of the said secondary sludge formed in step 4 to an anoxic/anaerobic zone and therein increasing the extracellular polymer content of said sludge; and
(6) recycling an effective amount of effluent from said anoxic/anaerobic zone to the said anoxic premixing zone of said mixing zone.

10. A method for flexibly increasing the settleability of suspended solids in the effluent of a trickling filter or trickling filter as part of a solids contact process, reducing biochemical oxygen demand (BOD) in purified wastewater, reducing nitrogen, and reducing phosphorus, comprising the steps of:
(a) retaining suspended solids derived substantially from said trickling filter in an anoxic/anaerobic zone for a time sufficient to increase the extracellular polymer content thereof;
(b) mixing the solids from said anoxic/anaerobic zone with the effluent from said trickling filter in an anoxic premixing zone; and
(c) thereafter subjecting said mixture to aerobic/mixing conditions.

11. A method for flexibly increasing the settleability of suspended solids in the effluent of a trickling filter or trickling filter as part of a solids contact process or activated sludge process, reducing biochemical oxygen demand (BOD) in purified wastewater, reducing nitrogen, and reducing phosphorus, comprising the steps of:
(a) retaining suspended solids derived substantially from the effluent of said trickling filter or activated sludge process in an anoxic/anaerobic zone;
(b) mixing said anoxic/anaerobic treated solids derived substantially from said trickling filter or activated sludge process that includes an increased extracellular polymer content with the effluent from a trickling filter or an activated sludge process in an anoxic premixing zone; and
(c) thereafter subjecting said mixture to aerobic/mixing conditions.

12. A wastewater treatment process having improved solids separation characteristics and reduced biochemical oxygen demand (BOD) in the purification wastewater comprising the steps of:
(1) passing wastewater containing suspended solids and biodegradable organic substances through an aerobic biological oxidation zone and therein oxidizing a portion of the BOD and converting a portion of the BOD into additional suspended solids;
(2) passing the effluent from said aerobic biological oxidation zone to an aerobic/mixing zone and therein mixing said effluent with effluent from the anoxic/anaerobic zone recited in step (4) below;
(3) passing the effluent from said aerobic/mixing zone to a settling zone and therein separating
(a) purified wastewater having reduced BOD and suspended solids, and
(b) sludge containing suspended solids,
(4) passing a portion of the sludge formed in step (3) to an anoxic/anaerobic zone and therein increasing the extracellular polymer content of said sludge; and
(5) recycling an effective amount of the effluent from said anoxic/anaerobic zone to said aerobic/mixing zone and
(6) recycling a portion of the purified wastewater separated in said settling zone to said aerobic/mixing zone as a diluent.

13. A wastewater effluent treatment process adapted to provide improved solids separation and reduced biochemical oxygen demand comprising
(a) treating suspended solids from an effluent from an aerobic biological oxidation process under anoxic/anaerobic conditions to increase extracellular polymer content and
(b) contacting the anoxic/anaerobic treated solids with effluent from an aerobic biological oxidation process by mixing under aerobic conditions
wherein the aerobic biological oxidation process comprises an activated sludge process.

14. A wastewater effluent treatment process adapted to provide improved solids separation and reduced biochemical oxygen demand comprising
(a) treating suspended solids from an effluent from an aerobic biological oxidation process under anoxic/anaerobic conditions to increase extracellular polymer content and
(b) contacting the anoxic/anaerobic treated solids with effluent from an aerobic biological oxidation process by mixing under aerobic conditions
wherein effluent from said contacting is subjected to settling and is separated into purified wastewater and a sludge containing suspended solids wherein a portion of the purified wastewater is recycled to the contracting step.

15. A wastewater effluent treatment process adapted to provide improved solids separation and reduced biochemical oxygen demand comprising
(a) treating suspended solids from an effluent from an aerobic biological oxidation process under anoxic/anaerobic conditions to increase extracellular polymer content and
(b) mixing the anoxicly/anaerobicly-treated solids with effluent from said aerobic biological oxidation process under anoxic conditions and
(c) mixing material from the anoxic mixing under aerobic conditions.

16. A wastewater effluent treatment process as recited in claim 15 wherein the aerobic biological oxidation process comprises a trickling filter process.

17. A wastewater effluent treatment process as recited in claim 15 wherein the aerobic biological oxidation process comprises of a trickling filter as part of a solids contact process.

18. A wastewater effluent treatment process as recited in claim 15 wherein the aerobic biological oxidation process comprises an activated sludge process.

19. A wastewater effluent treatment process as recited in claim 15 wherein the aerobic biological oxidation process comprises a rotating biological contactor process.

20. A wastewater effluent treatment process as recited in claim 15 wherein
effluent from said mixing under aerobic conditions is subjected to settling and is separated into purified wastewater and a sludge containing suspended solids.

21. A wastewater effluent treatment process as recited in claim 20 wherein
at least a portion of the sludge is passed to said treatment under anoxic/anaerobic conditions.

22. A wastewater effluent treatment process as recited in claim 20 wherein
a portion of the purified wastewater is recycled to the mixing step.

23. A wastewater effluent treatment process as recited in claim 15 wherein
effluent from said aerobic biological oxidation process is subjected to final settling to form a sludge and at least a portion of said sludge is subjected to said treatment under anoxic/anaerobic conditions.

24. A wastewater effluent treatment process as recited in claim 15 wherein effluent from said aerobic biological oxidation process is subjected to intermediate settling to form a sludge and at least a portion of said sludge is subjected to said treatment under anoxic/anaerobic conditions and effluent from said mixing under aerobic conditions is subjected to final settling to form a second sludge and at least a portion of said second sludge is subjected to said treatment under anoxic/anaerobic conditions.

* * * * *